US010933867B2

(12) United States Patent
Arnouse

(10) Patent No.: US 10,933,867 B2
(45) Date of Patent: Mar. 2, 2021

(54) ARTIFICIAL INTELLIGENCE BASED COLLISION AVOIDANCE SYSTEM AND METHOD

(71) Applicant: Arnouse Digital Devices Corporation, Greenvale, NY (US)

(72) Inventor: Michael Arnouse, Old Brookville, NY (US)

(73) Assignee: Arnouse Digital Devices Corporation, Greenvale, NY (US)

( * ) Notice: Subject to any disclaimer, the term of this patent is extended or adjusted under 35 U.S.C. 154(b) by 27 days.

(21) Appl. No.: 16/409,505

(22) Filed: May 10, 2019

(65) Prior Publication Data

US 2019/0263396 A1    Aug. 29, 2019

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G05D 1/028* (2013.01);
(Continued)

(58) Field of Classification Search
CPC .... B60W 30/08; B60W 30/09; B60W 30/095; B60W 30/0953; B60W 30/0956; B60T 2201/022; B60T 2201/024; B60T 8/17558; B60Y 2300/08; B60Y 2300/09; B60Y 2300/095; B60Y 2300/0952; B60Y 2300/0954; B60Y 2410/111; G05D 1/0238; G05D 1/024; G01S 13/93; G01S 13/931; G05B 2219/40339; G05B 2219/39091;
(Continued)

(56) References Cited

U.S. PATENT DOCUMENTS 7,176,797 B2    2/2007  Zai et al.
7,333,012 B1 *  2/2008  Nguyen ................. B60R 25/04
                                                340/426.1
(Continued)

FOREIGN PATENT DOCUMENTS

CN        106997205 A    *  8/2017
EP        1152108 B1     * 10/2005   ......... G07C 9/00309
WO     WO-2018187251 A1  * 10/2018   ........... G01S 13/931

*Primary Examiner* — Thomas G Black
*Assistant Examiner* — Sara J Lewandroski
(74) *Attorney, Agent, or Firm* — DLA Piper LLP (US)

(57) ABSTRACT

Systems and methods for avoiding an object by a vehicle. A radio frequency identification (RFID) tag is disposed on the object and transmits a tag signal associated with the RFID tag. The vehicle includes an object detection system and an object response controller. The object detection system detects the transmitted tag signal, determines at least one tag characteristic from the detected tag signal and tracks the object based on the at least one tag characteristic to generate object tracking data. The object response controller determines at least one collision condition between the vehicle and the object based on the object tracking data, and initiates at least one vehicle control action responsive to the at least one collision condition. The at least one vehicle control action including automatically controlling operation of the vehicle by the object response controller to avoid a collision between the vehicle and the object.

30 Claims, 8 Drawing Sheets

(51) Int. Cl.
    *G05D 1/02*           (2020.01)
    *G06K 19/07*         (2006.01)

(52) U.S. Cl.
    CPC ......... *G05D 1/0221* (2013.01); *G05D 1/0238* (2013.01); *G06K 19/0723* (2013.01); *G05D 2201/0213* (2013.01)

(58) Field of Classification Search
    CPC ....... G05B 2219/40317; G05B 19/061; H04W 12/00407; H04W 12/00; H04L 2209/84; H04B 5/0056; H04B 5/0062; G06K 7/10099; G06K 7/10386
    See application file for complete search history.

(56) References Cited

U.S. PATENT DOCUMENTS

| | | | |
|---|---|---|---|
| 7,336,184 B2 | 2/2008 | Smith et al. | |
| 9,302,594 B2* | 4/2016 | Tripathi | B60L 53/36 |
| 9,834,175 B2* | 12/2017 | Tokudome | B60R 25/241 |
| 2002/0067660 A1* | 6/2002 | Bokhour | G01S 13/931 |
| | | | 367/128 |
| 2002/0169533 A1* | 11/2002 | Browne | B60R 21/013 |
| | | | 701/45 |
| 2005/0168350 A1* | 8/2005 | Tauchi | G08G 1/161 |
| | | | 340/903 |
| 2006/0244632 A1* | 11/2006 | Corcoran, III | B60Q 1/44 |
| | | | 340/902 |
| 2007/0005609 A1* | 1/2007 | Breed | B60N 2/2863 |
| 2009/0043462 A1* | 2/2009 | Stratton | E02F 9/2033 |
| | | | 701/50 |
| 2011/0249118 A1* | 10/2011 | Bruno | B60W 30/0953 |
| | | | 348/148 |
| 2011/0282564 A1* | 11/2011 | Park | G06Q 10/08 |
| | | | 701/117 |
| 2012/0092173 A1* | 4/2012 | Sanchez | B60W 50/14 |
| | | | 340/576 |
| 2013/0124009 A1* | 5/2013 | Esler | H04L 67/125 |
| | | | 701/2 |
| 2014/0005874 A1* | 1/2014 | Brommer | B60W 30/095 |
| | | | 701/23 |
| 2015/0120125 A1* | 4/2015 | Thomson | G05D 1/024 |
| | | | 701/25 |
| 2015/0160653 A1* | 6/2015 | Cheatham, III | B60W 30/0956 |
| | | | 701/23 |
| 2015/0210249 A1* | 7/2015 | Morris | B60R 25/24 |
| | | | 701/1 |
| 2015/0353008 A1* | 12/2015 | Kline | G08G 1/162 |
| | | | 340/993 |
| 2016/0354931 A1* | 12/2016 | Jones | B25J 9/1694 |
| 2017/0113664 A1 | 4/2017 | Nix | |
| 2017/0372188 A1* | 12/2017 | Simon | G06K 9/00832 |
| 2018/0237006 A1* | 8/2018 | Ishii | B60W 50/0225 |
| 2018/0265080 A1* | 9/2018 | Funk | B60T 7/22 |
| 2018/0319394 A1* | 11/2018 | Phillipps | G08G 1/164 |
| 2018/0341821 A1* | 11/2018 | Hovis | G06K 9/00973 |
| 2018/0370360 A1* | 12/2018 | Hannon | H04W 76/10 |
| 2019/0039612 A1* | 2/2019 | Yang | B60W 40/02 |
| 2019/0108753 A1* | 4/2019 | Kaiser | H04W 4/02 |
| 2019/0152490 A1* | 5/2019 | Lan | B60W 30/0956 |
| 2019/0176820 A1* | 6/2019 | Pindeus | B60W 30/0956 |
| 2020/0250505 A1* | 8/2020 | Simon | G06K 9/00369 |

* cited by examiner

ARTIFICIAL INTELLIGENCE BASED COLLISION AVOIDANCE SYSTEM AND METHOD

TECHNICAL FIELD

The present disclosure relates generally to object detection and, in particular, to vehicular collision avoidance systems and methods for avoiding collision of an object by a vehicle.

BACKGROUND

An increasing number of vehicles include some type of advanced driver assistance system. Some of these systems may be built into the vehicle, whereas others may be available as an add-on or aftermarket package. In general, a driver assistance system may assist the vehicle operator in controlling the vehicle, by alerting the operator to potential problems (e.g., obstacles, other vehicles, etc.), to avoid collisions and accidents. In some examples the driver assistance system may take over control of the vehicle (e.g., in a semi-autonomous or autonomous manner). A driver assistance system may, for example, automate lighting, provide adaptive cruise control, alert the operator to other vehicles or potential hazards, indicate blind spots, indicate lane departure, provide some type of collision avoidance measure, and/or incorporate traffic and/or navigation warnings.

There is a need for a system and method to improve object detection in vehicle assistance systems and provide improved corrective measures for avoiding collision of a vehicle with one or more stationary and/or moving objects.

SUMMARY

Aspects of the present disclosure relate to collision avoidance systems, methods and non-transitory computer readable mediums for avoiding at least one object by a vehicle. The system includes a radio frequency identification (RFID) tag disposed on the at least one object and a vehicle including an object detection system and an object response controller. The RFID tag is configured to transmit a tag signal associated with the RFID tag. The object detection system is configured to detect the transmitted tag signal associated with the RFID tag, determine at least one tag characteristic from the detected tag signal and track the at least one object based on the at least one tag characteristic to generate object tracking data. The object response controller is configured to receive the object tracking data from the object detection system, determine at least one collision condition between the vehicle and the at least one object based on the object tracking data, and initiate at least one vehicle control action responsive to the at least one collision condition. The at least one vehicle control action includes automatically controlling operation of the vehicle by the object response controller to avoid a collision between the vehicle and the at least one object.

DETAILED DESCRIPTION

Figure 1:
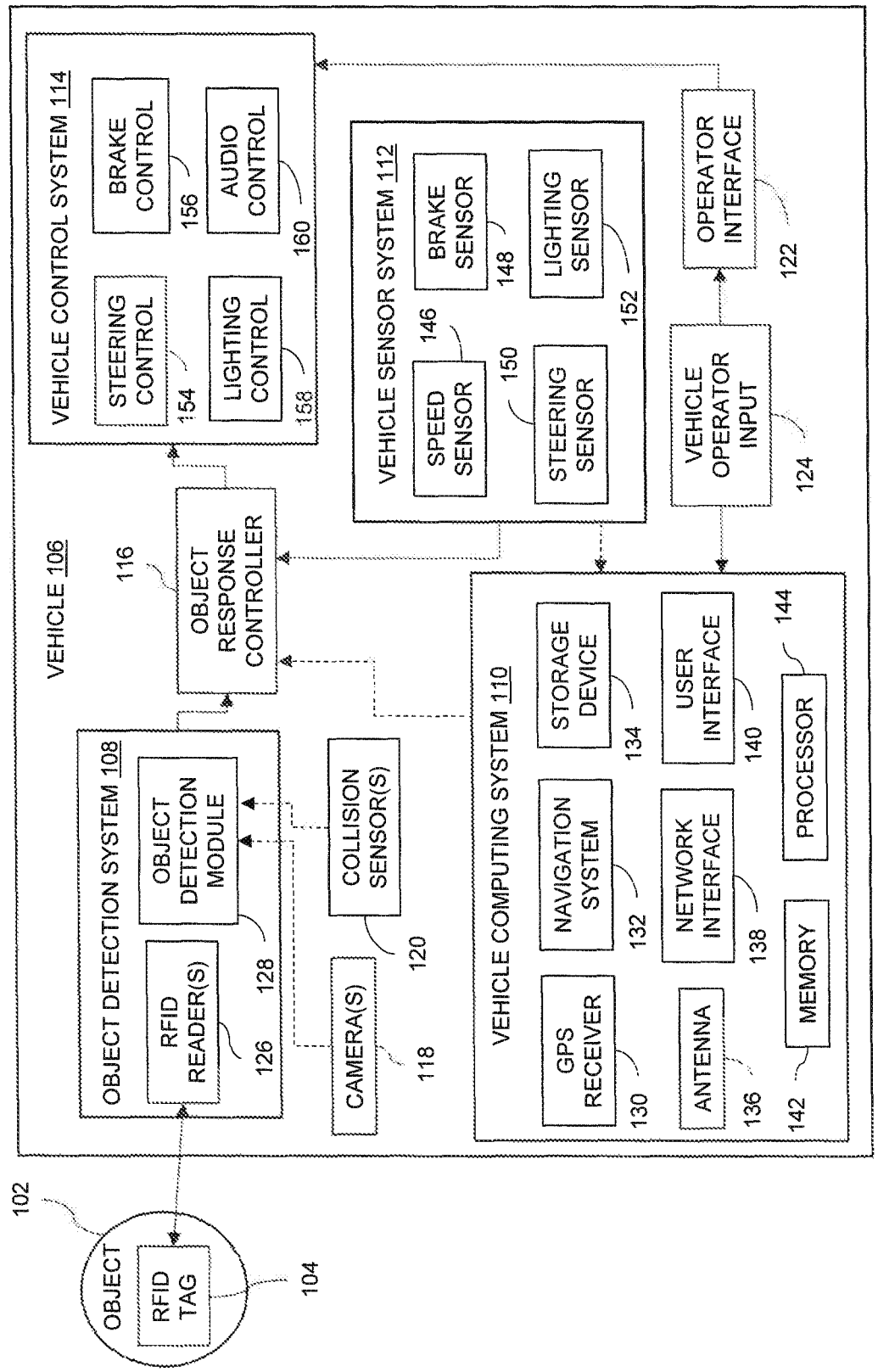
FIG. 1 is a functional block diagram of an example collision avoidance system, according to an aspect of the present disclosure.

Aspects of the present disclosure generally relate to collision avoidance systems and methods of avoiding at least one object by a vehicle. A collision avoidance system (CAS) of the present disclosure may include a radio frequency identification (RFID) tag disposed on at least one object and a vehicle having an object detection system and an object response controller for controlling operation of the vehicle, in order to avoid the object(s) (e.g., prevent a collision with the object(s)).

The RFID tag, according to the present disclosure, may be configured to transmit a tag signal associated with the RFID tag. In some examples, the tag signal may be periodically transmitted by the RFID tag. In some examples, the RFID tag may be configured to be wearable. For examples, the RFID tag may be detachably coupled or permanently coupled to the object. In some examples, the RFID tag may be embedded in clothing, jewelry, a hat, a glove, a shoe, etc.

The vehicle, according to aspects of the present disclosure may include an object detection system configured to detect the transmitted tag signal associated with the RFID tag, determine at least one tag characteristic from the detected tag signal and track the object(s) based on the tag characteristic(s) to generate object tracking data. The tag characteristic(s) may include, for example, characteristics associated with the RFID tag itself and/or characteristics of the object associated with the tag. In some examples, the object detection system may include one or more RFID readers for detecting the tag signal. In some examples, the RFID reader(s) may be configured for one or more tracking zones proximate the vehicle (e.g., see FIG. 4). In some examples, an object detection module of the object detection system may activate one or more RFID readers associated with one or more tracking zones to obtain object tracking data (e.g., a range of the object(s) relative to the vehicle, whether the object(s) is stationary or moving, a current trajectory of the object, a future trajectory of the object(s), a region containing the object(s), a speed of the object(s), one or more characteristics object(s), etc.).

The vehicle, according to aspects of the present disclosure may also include an object response controller configured to receive the object tracking data from the object detection system. The object response controller may be configured to determine at least one collision condition between the vehicle and the object(s) based on the object tracking data, and initiate at least one vehicle control action responsive to the collision condition(s). The vehicle control action(s) may include automatically controlling operation of the vehicle by the object response controller to avoid a collision between the vehicle and the object(s). In some examples, the vehicle control action(s) may include braking of the vehicle and/or one or more object avoidance maneuvers. In some examples, at least one of the collision condition(s) and the vehicle control action(s) may be based on, without being limited to, vehicle sensor information, vehicle position, navigation information, surrounding area information of the vehicle, the tag characteristic(s), traffic information, weather conditions, road conditions, and additional vehicle operation information and/or vehicle operator information.

As discussed above, vehicles are increasingly incorporating driver assistance systems to aid the vehicle operator, as well as automate one or more operator tasks. A conventional driver assistance system generally includes sensors, such as machine vision cameras, radar sensors and/or light detection and ranging (LIDAR) sensors. The sensors may be used to identify the road, identify one or more lanes within the road and/or objects around the vehicle (e.g., other vehicles, pedestrians, etc.). Some driver assistance systems may warn the vehicle operator of any detected anomalies (lane departure, object(s) in the vehicle path, etc.). Some driver assistance systems may assume control of the vehicle (e.g., applying brakes to avoid a collision, controlling the steering system to keep the vehicle in the same lane).

Conventional driver assistance systems may be susceptible to sensor errors and/or inconsistencies in classification of anomalies. For example, a sensor (e.g., machine vision cameras) may detect anomalies that do not actually exist, or may confuse a non-hazard (e.g., steam) with an actual hazard (e.g., a physical object). As another example, a radar sensor may mistakenly classify one type of object (e.g., debris) as another type of object (e.g., vehicle), for example, based on the radar signature. Sensor errors and/or classification errors may cause the ADAS to make an unsuitable decision, such as braking when no action is necessary. In addition to inaccuracies in sensor data, conventional driver assistance systems may incorrectly interpret the sensor data. For example, the driver assistance system may interpret the sensor data in a manner that is inconsistent with the actual conditions. An incorrect interpretation of the sensor data (even if the sensor data is correct) by the driver assistance system, may lead to an improper driver assistance action.

Collision avoidance systems of the present invention, in contrast to conventional systems, represent an active detection system, in which the object (to be detected) itself provides information, through the tag signal, indicating its presence. In the present disclosure, the RFID tag may include specific RFID tag characteristics and/or object characteristics in the tag signal. Because the object, through the RFID tag, actively broadcasts its information, the object detection system can use information about the detected tag signal itself (e.g., signal strength, frequency band, time information, etc.) along with information within the tag signal (e.g., an RFID tag identifier, a transmission time interval of the tag signal) to detect the RFID tag and track the object, while reducing sensor errors and/or false classifications. In addition, object information within the tag signal (e.g., any disabilities of a wearer of the RFID tag) may also aid in determining appropriate collision avoidance actions. Yet further, because the object detection system may analyze characteristics of the tag signal, the object detection system does not need to perform complex image processing, machine learning techniques in order to detect and classify the object from a surrounding area. Thus, the object detection system of the present disclosure may detect and track the object with reduced computationally complex processing, thereby providing faster object tracking while still providing accurate results.

Referring to FIG. 1, FIG. 1 is a functional block diagram illustrating example collision avoidance system (CAS) 100, according to aspects of the present disclosure. CAS 100 may include at least one object 102 having at least one radio frequency identification (RFID) tag 104 and vehicle 106. Vehicle 106 may include object detection system 108, vehicle computing system 110, vehicle sensor system 112, vehicle control system 114 and object response controller 116. In some examples, vehicle 106 may include one or more of at least one camera 118 and at least one collision sensor 120. In some examples, vehicle 106 may include operator interface 122 configured to accept vehicle operator input 124.

Object(s) 102 may include any moving or stationary object, including, but not limited to, humans, animals, vehicles (non-motorized and/or motorized vehicles, such as, without being limited to, bicycles, skateboards, electric scooters, cars, trucks, etc.), other physical objects (e.g., construction barrels, traffic cones, etc.). Although FIG. 1 illustrates one object 102, CAS 100 is not limited to detection/tracking/avoidance of one object. In general, CAS 100 may be configured to operate with one or more objects 102 having respective RFID tags 104.

RFID tag 104 may be affixed to object 102. In some examples, RFID tag 104 may be worn. In some examples, RFID tag 104 may be incorporated into an article of clothing and/or jewelry (such as a shirt, a belt, a bracelet, a hat, a shoe, etc.). In general, RFID tag 104 may be configured to transit a tag signal indicating the presence of object 102. Although FIG. 1 illustrates one RFID tag 104 affixed to object 102, in some examples, object 102 may include one or more RFID tags 104. RFID tag 104 is described further below with respect to FIG. 2.

Vehicle 106 may include any type of machine for transporting items (e.g., people, goods) including, without being limited to, cars, motorcycles, trucks, buses, trains, watercraft, aircraft, etc. Vehicle 106 may be configured to be autonomous, semi-autonomous or non-autonomous. In general, vehicle 106 may include any type of machine including a processor, for transporting items.

Object detection system 108 may include at least one RFID reader 126 and object detection module 128. In some examples, object detection system 108 may include a processor (not shown) and non-transitory memory (not shown) storing computer readable instructions. In some examples, object detection module 128 may be embodied in specialized software, firmware, specially-configured hardware or any combinations thereof. In some examples, object detection system 108 may include storage (such as storage 314 shown in FIG. 3), for example, to store various tag and/or object tracking characteristics (described below) for one or more objects 102.

Figure 3:
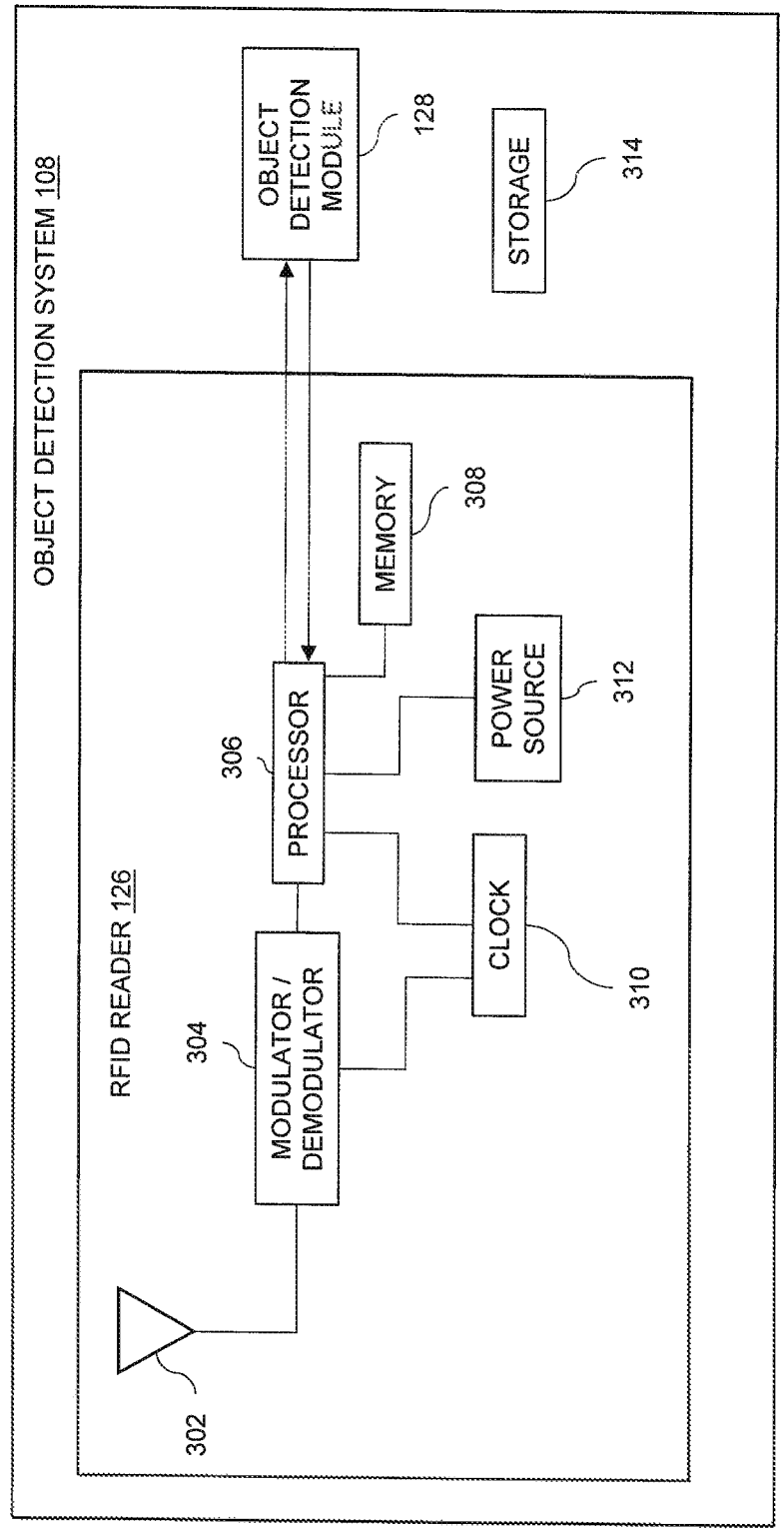
FIG. 3 is a functional block diagram of an example RFID reader associated with the collision avoidance system shown in FIG. 1, according to an aspect of the present disclosure.
Figure 4:
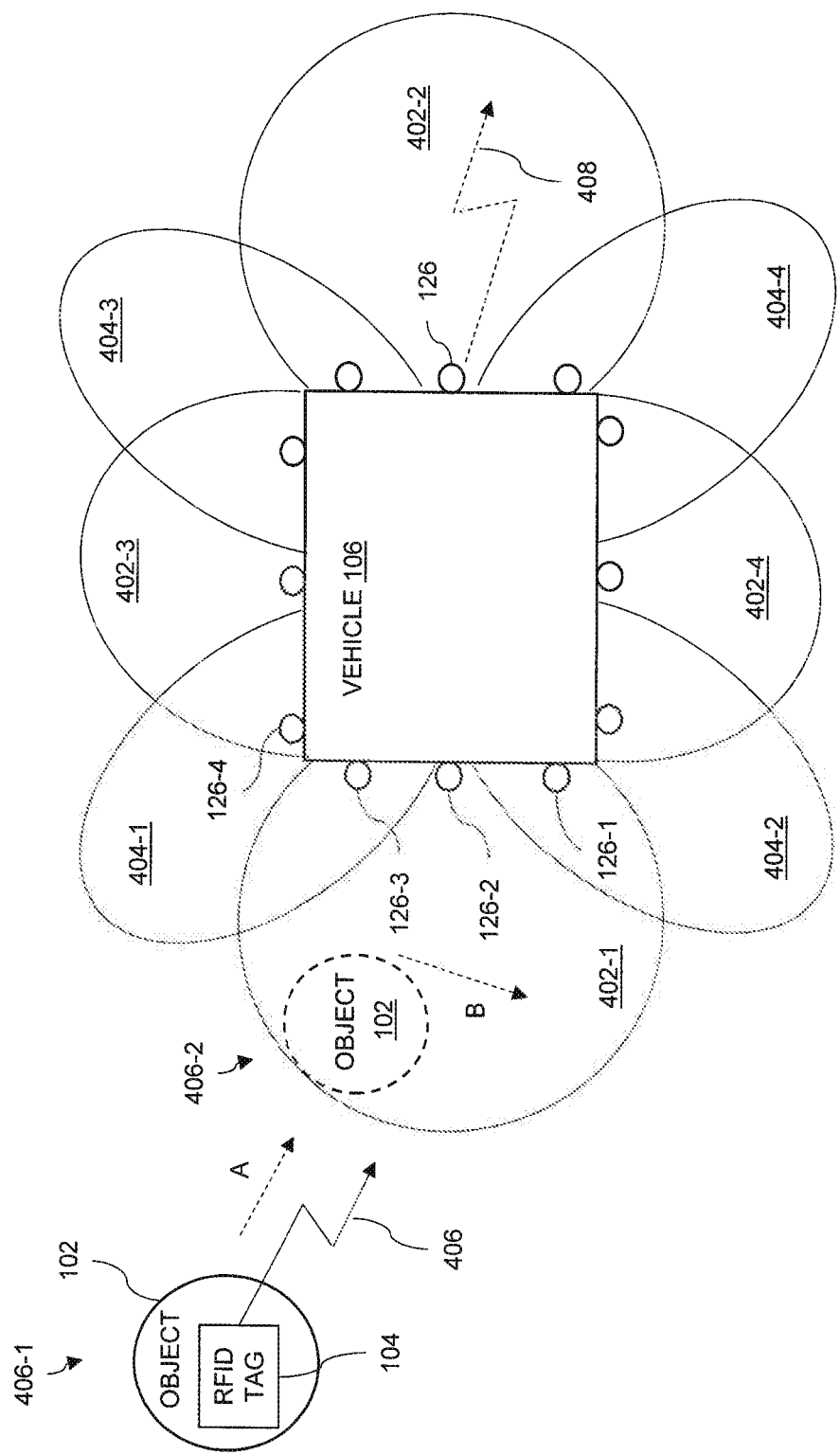
FIG. 4 is an example diagram illustrating one or more tracking zones that may be configured for a vehicle for detecting an object via RFID tracking, associated with the collision avoidance system shown in FIG. 1, according to an aspect of the present disclosure.

In general, RFID reader 126 may be configured to detect a tag signal transmitted from RFID 104 associated with object 102 (illustrated as tag signal 406 in FIG. 4). In some examples, RFID reader 126 may determine at least one characteristic about the detected tag signal and/or object 102 associated with RFID tag 104, based on the tag signal. In some examples, RFID reader 126 may also transmit an interrogation signal (illustrated as interrogation signal 408 in FIG. 4), for example, to verify RFID tag 104. RFID reader 126 is described further with respect to FIGS. 3 and 5.

Object detection module 128 may be configured to track object 102, based on the detected tag signal and/or tag signal characteristic(s) obtained from RFID reader 126. Object detection module 128 may track, for example, without being limited to, a range (distance) to object 102, whether object 102 is stationary or moving, a speed of object 102, a trajectory of object 102, predict a future trajectory of object 102, a region (e.g., a two-dimensional area or a three-dimensional region) containing object 102, additional information regarding object 102 (e.g., that object 102 is a human with a hearing disability), etc. In some examples, RFID tag 104 may be a moving target (e.g., object 102 may be moving, such as along a direction shown by arrow A in FIG. 4). Object detection system 108 (and in some examples together with camera(s) 118) may recognize a direction of RFID tag 104 and predict its movement (e.g., where it may be going, such as a predicted travel direction) for a predetermined range (e.g., for the next few feet, the next meter, etc.).

In some examples, object detection module 128 may also be configured to control activation and/or monitoring of one or more particular RFID readers 126. For example, object detection module 128 may create one or more tracking zones through selective activation and/or monitoring of particular RFID readers 126. For example, referring to FIG. 4, a plurality of tracking zones 402 (e.g., 402-1, 402-2, 402-3, 402-4) and tracking zones 404 (e.g., 402-1, 402-2, 402-3, 402-4) may be created, for detecting tag signal 406 (of RFID tag 104 associated with object 102). For example, a plurality of RFID readers 126 may be positioned on a body of vehicle 106. Selective groups of RFID readers 126 may be configured and associated with specific tracking zones 402 and/or 404. For example, RFID readers 126-1, 126-2, 126-3 may form tracking zone 402-1. RFID readers 126-3 and 126-4 may form tracking zone 404-1. Tracking zones 404 are similar to tracking zones 402, except that tracking zones 404 include combinations of RFID readers 126 arranged on different vehicle body planes. It is understood that the number of RFID readers 126 and arrangement of RFID readers 126 on the body of vehicle 106, in FIG. 4, represents a non-limiting example, and that any number of RFID readers 126 and tracking zones 402 and/or 404 may be configured in accordance with the present disclosure.

In some examples, object detection module 128 may analyze information collected from a number of RFID readers 126 (e.g., RFID readers 126-1, 126-2 and 126-3), to verify that tag signal 406 is indeed detected, for example, in tracking zone 402-1. For example, to verify that tag signal 406 associated with object 102 is detected in tracking zone 402-1, as object 102 moves along the direction indicated by arrow A. In this manner, the use of plural RFID readers 126 may reduce false tag detection, and may improve object tracking results.

In some examples, object detection module 128 may analyze information collected from a number of RFID readers 126 (e.g., RFID readers 126-1, 126-2 and 126-3), to track any movement of object 102 through the tracking region (e.g., movement of object 102 along the direction indicated by arrow B in tracking region 402-1). In some examples, information from two or more RFID readers 126 may be analyzed to minimize false detection and for movement tracking. It is understood that object detection module 128 may analyze any number of tag signal characteristics in combination with any number of RFID readers 126 to suitably track object 102.

In some examples, object detection module 126 may create a number of predetermined tracking zones 402, 404, with a predefined arrangement of RFID readers associated with respective predetermined tracking zones 402, 404. In some examples, object detection module 126 may be configured to adaptively determine which of RFID readers 126 to activate and monitor for tag signal 406, to form adaptively configurable tracking zones.

In some examples, object detection module 128 may use tracking results in one zone (e.g., tracking zone 402-1) to predict at least one other possible tracking zone (e.g., tracking zone 404-2) to activate and monitor for tag signal 406. For example, movement of object 102 in tracking zone 402-1 (e.g., along the direction indicated by arrow B) may indicate possible movement into tracking zone 404-2. In this manner, object detection module 128 may intelligently predict and track the position and/or movement of object 102 over time, thereby leading to improved collision avoidance by object response controller 116 (described further below).

In some examples, object detection module 128 may also receive additional data from one or more among camera(s) 118 and collision sensor(s) 120 (or any other suitable data source). Object detection module 128 may use the additional data, in combination with tag signal information/characteristics from RFID reader(s) 126 for tracking of object 102. For example, additional data form camera(s) 118 and/or collision sensor(s) 120 may be used to reduce false detection of tag signal 406 and/or to improve tracking of object 102. Camera(s) 118 may include, without being limited to, a machine vision cameras, a backup camera, bird's eye view camera, etc. Collision sensor(s) 120 may include any suitable sensor for detecting an object in the path of vehicle 106, such as, without being limited ultrasound sensors, radar sensors (e.g., millimeter wavelength radar), laser sensors, light emitting diode (LED) sensors and GPS radio frequency detection devices. Object detection module 128 is describe further below with respect to FIG. 6.

Vehicle computing system 110 may include one or more of GPS receiver 130, navigation system 132, storage device 134, antenna 136, network interface 138, user interface 140, memory 142 and processor 144. It is understood that FIG. 1 illustrates a non-limiting example of components of vehicle computing system 110, and that vehicle computing system 110 may include more or fewer components than the components illustrated. In general, vehicle computing system 110 may provide information and/or data content (e.g., entertainment content such as audio and/or video media content, navigational services, safety information such as rear view camera data, etc.) for the vehicle operator and/or a passenger of vehicle 106. In some examples, vehicle computing system 110 may include a vehicle infotainment system. In general, vehicle computing system 110 may be coupled to various systems and/or sub-systems of vehicle 106, hardware components, specialized software and/or firmware for providing information and/or data content.

Vehicle computing system 110 may include global positioning system (GPS) receiver 130 for receiving one or more positioning signals, for example, from one or more GPS satellites. The positioning signals may be used to determine a geographical position of vehicle 106. GPS receiver 130 may also be configured to receive time information together with the location information (i.e., the positioning signal(s)).

Vehicle computing system 110 may include navigation system 132 configured to receive and/or generate navigation information such as a location of vehicle 106, traffic information, driving directions, point of interest information (e.g., gas station) and/or other navigational information for the vehicle operator. Navigation system 132 may communicate with GPS receiver 130, one or more sensors from vehicle sensor system 112 and/or any other suitable sensors. In some examples, navigation system 132 may include an inertial navigation system to determine a position, orientation and/or velocity of vehicle 106. The inertial navigation system may include, without being limited to, at least one motion sensor (e.g., an accelerometer), at least one rotation sensor (e.g., a gyroscope), at least one speed measuring device, at least one barometric altimeter and/or at least one magnetic sensors (e.g., a magnetometer). In some examples, navigation system 132 may transmit and/or receive data from one or more external navigation services (for example, via network interface 138).

Vehicle computing system 110 may include storage device 134 configured to store data such as instructions executable by processor 144. In some examples, storage device 134 may store application data for one or more applications for use with various systems and subsystems of vehicle 106. In some examples, storage device 134 may include a non-volatile storage device.

Vehicle computing system 110 may include at least one antenna 136. Although FIG. 1 illustrates one antenna 136, it is understood that in some examples, vehicle computing system 110 may include more than one antenna 136. In some examples, antenna 136 may be communicatively coupled to network interface 138. In some examples, at least a portion of GPS receiver 130 may be part of antenna 136. In some examples, antenna 136 may be configured to obtain broadband wireless internet access. In some examples, antenna 136 may be configured to receive broadcast signals such as, without being limited to, radio, television, traffic, weather, etc. In some examples, antenna 136 may be configured to receive instructions and/or commands from one or more external sources (e.g., an external condition monitoring system, a centralized traffic control system, etc.).

Vehicle computing system 110 may include at least one network interface 138. Network interface 138 may be configured to communicate with one or more external sources via at least one network (not shown). In some examples, an external source may include a server. In some examples, the server may include a virtual server.

Although not shown in FIG. 1, in some examples, vehicle computing system 110 may include at least one interface for communicating with (e.g., receiving and/or transmitting information and/or data) one or more external devices. The external devices may include, without being limited to, mobile devices (e.g., smart phones, wearable devices, wearable sensors, etc.) external storage devices (such as USB drives, solid state drives, etc.), etc. The interface may be configured for example, for wireless communication (e.g., Bluetooth, near-field communication (NFC), Wi-Fi, etc.) and/or for wired communication (e.g., universal serial bus (USB)).

Although not shown in FIG. 1, in some examples, vehicle computing system 110 may include an internal vehicle communication system for interfacing with various systems and sub-systems of vehicle 106. The internal communication system may be configured, for example, to output information and/or data to other systems (e.g., vehicle control system 114, object response controller 116) and receive information and/or data from other systems (e.g., vehicle sensor system 112). In some examples, the internal communication system may include an in-vehicle data network.

Vehicle computing system 110 may include user interface 140 for interacting with one or more components and/or applications of vehicle computing system 110. User interface 140 may be configured to be controlled via vehicle operator input 124 (and/or any passenger input). In some examples, user interface 140 may include a graphical user interface, such as a touch screen, a display, and/or user-activated mechanical elements (e.g., buttons, switches, knobs, sliders, etc.). In some examples, user interface 140 may include steering wheel controls, door and/or window controls, instrument panel controls, etc. In some examples, user interface 140 may display notifications, warnings, navigation information and other messages on a display of user interface 140.

Vehicle computing system 110 may include memory 142 configured to store computer-readable instructions executable by processor 144 for controlling vehicle computing system 110 to perform the functions described herein. In general, memory 142 may include any suitable non-transitory computer readable storage medium, including without being limited to, at least one of a read-only memory (ROM), a random access memory (RAM), a flash memory, a dynamic RAM (DRAM) and a static RAM (SRAM).

Vehicle computing system 110 may include processor 144 configured to execute processing logic for performing the operations of vehicle computing system 110 described herein. Processor 144 may include, without being limited to, a microprocessor, a central processing unit, an application specific integrated circuit (ASIC), a field programmable gate array (FPGA), a digital signal processor (DSP) and/or a network processor.

Vehicle sensor system 112 may include at least one speed sensor 146, at least one brake sensor 148, at least one steering sensor 150 and, in some examples, at least one lighting sensor 152. Speed sensor 146 may be configured to determine a current speed of vehicle 106. Brake sensor(s) 148 may be configured to determine a current braking operation (e.g., whether braking is being applied, an extent of any applied braking, etc.). Steering sensor 150 may be configured to determine a current steering operation (e.g., steering angle, steering wheel angle, etc.). Lighting sensor 152 may be configured to determine a current lighting condition (e.g., interior cabin lighting, external vehicle lighting, external ambient lighting conditions, etc.).

It is understood that FIG. 1 illustrates a non-limiting example of components of vehicle sensor system 112, and that vehicle sensor system 112 may include more or fewer components than the components illustrated. Other non-limiting examples of vehicle sensors include suspension sensors, shock sensors, sensors related to vehicle movement, transmission sensors (e.g., gear, clutch, etc.), sensors related to gas pedal input, tire pressure sensors, seat belt sensors, occupancy sensors, weight sensors (occupant weight, payload weight, etc.), brake pad wear sensors, tire temperature sensors, engine information sensors (e.g., engine speed), ambient temperature sensors, vehicle inclination sensors, climate control system sensors, audio sensors, etc.

Vehicle control system 114 may include steering control 154 (e.g., for controlling steering of vehicle 106, cruise control, etc.), brake control 156 (e.g., for controlling application(s) of one or more brakes of vehicle 106), lighting control 158 (e.g., for controlling internal lighting, external lights such as headlights, brake lights, turn signals, hazard lights, etc. of vehicle 106) and audio control 160 (e.g., for controlling any audio levels inside vehicle 106, controlling any external audio such as a horn or other audio announcements projected outside of vehicle 106).

It is understood that FIG. 1 illustrates a non-limiting example of components of vehicle control system 114, and that vehicle control system 114 may include more or fewer components than the components illustrated. In general, vehicle control system 114 may include controls for adjusting settings of various vehicle control components related to the engine, brake(s), steering, driving, elements within vehicle 106, and/or elements on an exterior of vehicle 106.

Object response controller 116 may be configured to receive information/data from object detection module 128 (of object detection system 108) regarding any tracked object 102 and vehicle sensor information from among components of vehicle sensor system 112, and control operation of vehicle 106 through control of vehicle control system 114. In some examples, object response controller 116 may receive data and/or information from one or more components of vehicle computing system 110. In some examples, object response controller 116 may receive data and/or information from camera(s) 118 and/or collision sensor(s) 120. In general, object response controller 116 may be configured to implement one or more collision avoidance measures to avoid object 102. In some examples, object response controller 116 may cause vehicle 106 to slow down and or stop (via control of vehicle control system 114). In some examples object response controller 116 may control maneuvering around object 102 (e.g., via a combination of driving, steering and speed control) through control of vehicle control system 114. Object response controller 116 is described below with respect to FIG. 7.

In some examples, one or more components of object detection system 108 (e.g., RFID reader(s) 126 and/or object detection module 128) and/or object response controller 116 may include one or more algorithms, such as, but not limited to artificial intelligence (AI) algorithms. In some examples, the algorithm(s) may be configured to cause vehicle 106 to react to object 102 based on a prediction of any future actions of object 102 (e.g., predict what object 102 is most likely to do next, such as any movement, direction of travel, etc.). Thus, in some examples, the algorithm(s) may cause object response controller 116 (which receives output from object detection system 108) to control operation of vehicle control system 114, in a reactive manner, based on one or more predicted (e.g., future) actions of object 102. Accordingly, in some examples, object response controller 116 may determine one or more avoidance actions that may be appropriate (such as maneuvering vehicle 106 in a particular direction, stopping, etc.) based on one or more predicted object actions.

In some examples, object detection system 108 and/or object response controller 116 may be configured to actively obtain additional information from one or more external data sources (e.g., via network interface 138) under one or more predetermined conditions. Algorithm(s) of object detection system 108 and/or object response controller 116 may incorporate the obtained external data into the analysis to determine one or more vehicle control actions (described further below).

The predetermined condition(s) for obtaining external data may include, for example, an emergency condition, such as if the algorithm(s) cannot determine suitable vehicle control actions (e.g., an indeterminate state), based on the data obtained via object detection system 108 (as well as, in some examples, additional data from other components of vehicle 106). For example, data obtained via vehicle 106 may, in some cases, be inconclusive (e.g., may be less than a predetermined threshold, may be less than a predetermined confidence level, may be obscured by noise, etc.). When the algorithm(s) determine that the analysis meets the predetermined condition(s), object detection system 108 and/or object response controller 116 may initiate communication with one or more external data sources (not shown), to obtain additional information in order to determine vehicle control action(s). In other words, vehicle 106 may allow interference from external data source(s) (e.g., the outside world), in order to determine how to avoid object 102 (e.g., what action(s) to cause vehicle 106 to perform to avoid object 102).

In some examples, object detection system 108 and/or object response controller 116 may identify one or more external data sources that are proximate to vehicle 106 and/or object 102 (e.g., within a predetermined range of vehicle 106 and/or object 102). Object detection system 108 and/or object response controller 116 may then initiate communication with the identified external data source(s) over one or more electronic communication network and obtain data from the external source(s) that may indicate information associated with object 102, information associated with object 102 relative to vehicle 106 and or any combination therein.

The external data source(s) may include, without being limited to, another vehicle proximate to vehicle 106 having CAS 100, a central server in communication with at least vehicle 106 and, in some examples, one or more other vehicles having CAS 100, a remote electronic database storing up-to-date information (e.g., collected from one or more vehicles (including, in some examples one or more vehicles 106), traffic cameras, etc.), an intelligent transportation system (ITS), one or more networked cameras in proximity to vehicle 106, etc. It is understood that vehicle 106 may communicate with and incorporate data from any suitable external data source that may assist vehicle 106 in determining vehicle control action(s) for avoiding object 102.

In another example, object detection system 108 and/or object response controller 116 may combine detection of object 102 (via RFID reader(s) 126) with a determination of one or more other characteristics of object 102 that may not be detectable by RFID reader(s) 126, such as a size of object 102, identification of object type (e.g., human, dog, horse, vehicle, bicycle, etc.), and/or any other suitable object characteristic. To determine the other object characteristic(s), object detection system 108 and/or object response controller 116 may trigger one or more other sensors of vehicle 106 (such as camera(s) 118, etc.) to capture information associated with object 102, in order to determine the other object characteristic(s). In some examples, the other sensor(s) may be configured (e.g., via suitable programming) to also determine the other characteristic(s) from the captured information. In general, AI algorithm(s) of object detection system 108 (and/or object response controller 116) and/or other programming of one or more processing components of vehicle 106 may be configured to determine the other object characteristic(s). Object response controller 116 may be configured to determine appropriate vehicle control action(s) for avoiding object 102 based on the characteristics determined via RFID reader(s) 126 in combination with the other characteristic(s) of object 102 obtained via other sensor(s) of vehicle 106 (or in some examples, on external data sources).

In some examples, AI algorithms (of object detection system 108 and/or object response controller 116) or other programming of processing component(s) of vehicle 106 may be configured to determine different (e.g., hierarchical) levels of object characteristic recognition. For example, a first level of recognition may include an object size (and/or other suitable dimensions), a second level of recognition may include an object shape, a third level of recognition may include identification of object type, a fourth level of recognition may include any erratic behavior patterns, etc. The number of levels of recognition selected for determining the other object characteristic(s) may be based on predetermined thresholds and/or a predetermined set of rules for obtaining appropriate object characteristics (such as, for example, to avoid false detection of any objects). For example, if the object is less than a predetermined size threshold, an additional (e.g., higher) level of recognition may not be triggered. If the object is between first and second predetermined size thresholds, the second and/or third levels of recognition may be triggered (e.g., to identify object 102 and distinguish between different types of objects that may have the same range of size, such as between a dog and a bicycle). It is understood that fewer levels of recognition, any other additional suitable levels of recognition, and any information to be determined in a recognition level are also contemplated by the present disclosure.

As one non-limiting example, when RFID reader(s) 126 detect object 102 (via RFID tag 104), object detection module 128 may not be configured to identify a size of object 102 (e.g., unless such information is included in tag signal 406). In some examples, responsive to RFID tag detection by RFID reader(s) 126, RFID object detection module 128 (or object response controller 116) may further trigger camera(s) 118 to capture one or more images (or video) of object 102 and, in some examples, track any movement of object 102. Camera(s) 118 may be configured to measure one or more dimensions of object 102 (e.g., via the captured image(s)/video frame(s)), and track object 102 in the image(s)/video, for example, based on the measured dimension(s) of object 102. Yet further, based on the dimensions(s) of object 102, one or more processing components of vehicle 106 (e.g., object detection module 128, object response controller 116, processor 144, etc., in combination, for example, with predetermined information stored in one or more databases) may be configured to identify the object type (e.g., whether object 102 is a human, a dog, a horse, a vehicle or a bicycle). Object response controller 116 may be configured to use the identified object type to determine appropriate vehicle control action(s) and cause vehicle 106 to avoid object 102 (e.g., avoid any collision with object 102).

In some examples, vehicle 106 may include operator interface 122 for receiving vehicle operator input 124, and for controlling operation of one or more components of vehicle control system 114. For example, operator interface 122 may include, for example, a steering wheel, a gas pedal, a brake pedal, a gear shift, etc. In some examples, operator interface 122 may be included for semi-autonomous and non-autonomous vehicle operation. In some examples, operator 122 may not be included, for example, under autonomous vehicle operation.

Figure 2:
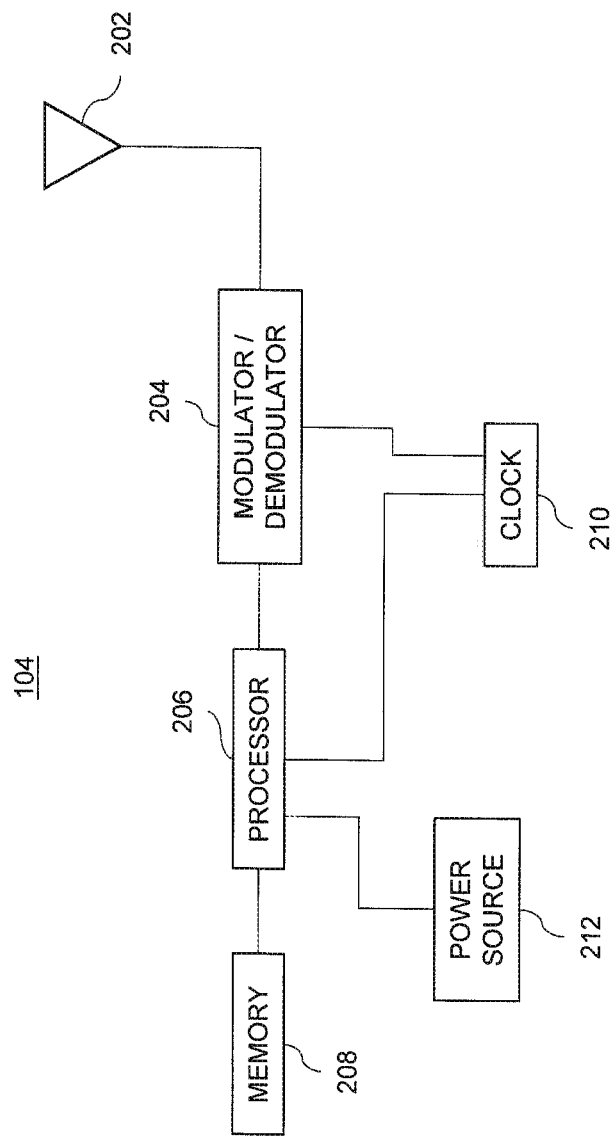
FIG. 2 is a functional block diagram of an example radio frequency identification (RFID) tag associated with the collision avoidance system shown in FIG. 1, according to an aspect of the present disclosure.

Referring next to FIG. 2, FIG. 2 is a functional block diagram illustrating example RFID tag 104 of CAS 100, according to an aspect of the present disclosure. RFID tag 104 may include at least one antenna 202, modulator/demodulator 204, processor 206, memory 208, clock 210 and power source 212.

In some examples, RFID tag 104 may be embodied as an integrated circuit including at least modulator/demodulator 204, processor 206 and memory 208. In some examples, the integrated circuit may include power source 212. In some examples, power source 212 may be separate from the integrated circuit. In some examples, RFID tag 104 may include programmable logic configured to be written, for example, with information associated with object 102. In some examples, RFID tag 104 may represent an active tag (e.g., where RFID tag 104 actively transmits tag signal 406).

Antenna 202 may be configured to transmit a modulated RF signal (e.g., tag signal 406 as shown in FIG. 4) received from modulator/demodulator 204. In some examples, antenna 202 may be configured to receive a modulated RF signal transmitted from RFID reader 126 (e.g., interrogation signal 408 shown in FIG. 4) on vehicle 106 (FIG. 1). In some examples, antenna 202 may include at least one transmitting antenna. In some examples, antenna 202 may include at least one transmitting antenna and at least one separate receiving antenna. In some examples, antenna 202 may include at least one integrated transmitting and receiving antenna.

Modulator/demodulator 204 may include a circuit for at least modulating an output signal generated by processor 206 (to form tag signal 406). In some examples, modulator/demodulator 204 may also include a circuit for demodulating a modulated RF signal received by antenna 202. Thus, in some examples, modulator/demodulator 204 may include a modulator. In some examples, modulator/demodulator 204 may include both a modulator and a demodulator. In some examples, the modulator and demodulator may be combined in a single transceiver circuit. In general, modulator/demodulator 204 may be implemented in any suitable way known in the art.

Processor 206 may be configured to generate the output signal for output to modulator/demodulator 204. To generate the output signal, processor 206 may include information associated with RFID tag 104 and/or object 102, stored in memory 208. In some examples, processor 206 may periodically generate the output signal, according to at least one predefined time interval (e.g., stored in memory 208). Processor 206 may periodically generate the output signal in accordance with clock 210.

In some examples, processor 206 may be configured to receive a demodulated interrogation signal (from modulator/demodulator 204) transmitted by RFID reader(s) 126 (e.g., interrogation signal 408). Processor 206 may generate, in response to the demodulated interrogation signal, processor 206, an acknowledgement (ACK) signal for transmission to RFID reader 126.

In some examples, processor 206 may be configured to receive a (demodulated) interrogation signal (e.g., interrogation signal 408) transmitted by RFID reader(s) 126. Processor 206 may determine whether the interrogation signal is within a predetermined range of RFID tag 104 (e.g., several feet away from vehicle 106, about a meter away from vehicle 106, etc.). For example, RFID tag 104 may determine the range to the interrogation signal based on a signal strength of the received interrogation signal (e.g., in accordance with a predetermined relationship or predetermined comparison between signal strength and range). Processor 206 may be configured to generate the output signal (e.g., tag signal 406) when the interrogation signal is within the predetermined range. Thus, in some examples, RFID tag 104 may be configured to be interactive with RFID reader(s) 126 when RFID reader(s) 126 is within a predetermined range of RFID tag 104.

In general, processor 206 may include information associated with RFID tag 104 and/or object 102 in the output signal. The information may include, without being limited to, a specific tag identifier, an object identifier, additional information regarding the object (e.g., a disability such as a hearing impairment, an age of object 102 (e.g., a child), that the object is stationary (e.g., such as a physical barrier), etc.), the predefined time interval for transmission of any periodic tag signals, etc. RFID reader 126 may use the tag/object information for improved object tracking and object response controller 116 may also use the tag/object information for improved collision avoidance control analysis.

For example, information on any disabilities of object 102 may direct how object response controller 116 controls components of vehicle control system 114 (e.g., control of any audible alarms versus visual alarms to object 102, predicting movement of object 102 and a possible maneuverability of vehicle 106 to avoid object 102, etc.).

As another example, an age (where object 102 is a human), may also factor into the analysis by object response controller 116 for determining possible maneuverability of vehicle 106, in order to avoid object 102. For example, a child may be more unpredictable in their movements compared to an adult. Object response controller 116 may determine that a best course of action may be to stop vehicle 116 as opposed to maneuvering around object 102 when object 102 is a child. It is understood that the examples represent non-limiting examples, and that any suitable information regarding RFID tag 104 and/or object 102 for object tracking and collision avoidance by CAS 100 may be used.

In some examples, processor 206 may be configured to generate the output signal for one or more frequency bands. In some examples, processor 206 may periodically generate the output signal for transmission in at least two different frequency bands with a same predefined time interval and/or simultaneously. In some examples, processor 206 may be configured to periodically generate the output signal for transmission in at least two different frequency bands with different predefined time intervals and/or at staggered transmission times. In general, the output signal may be transmitted in one or more frequency bands, including for example, a low frequency (LF) range band (e.g., about 30 kHz to about 300 kHz), a high frequency (HF) range band (e.g., about 3 MHz to about 30 MHz), an ultra high frequency (UHF) range band (e.g., about 300 MHz to about 3 GHz) and/or a super high frequency (SHF) range band (e.g., about 3 to about 30 GHz). In general, as the RF frequency increases, the RF signal range may increase (e.g., from about 10 cm (for a LF band), including about 1 m (for a HF band), and including about 200 m (for a SHF band)). In addition, as the RF frequency range increase, the data speed generally increases.

Processor 206 may include, without being limited to, a microprocessor, an application specific integrated circuit (ASIC), a field programmable gate array (FPGA), and/or a digital signal processor (DSP) configured to execute processing logic for performing the functions described herein.

Memory 208 may be configured to store information, such as tag and/or object information. In some examples, memory 208 may include non-volatile memory (e.g., to retain information even when RFID tag 104 does not have power).

Clock 210 may include any suitable clock circuit configured to coordinate operation of one or more of modulator/demodulator 204, processor 206, memory 208 and power source 212.

Power source 212 may be configured to power RFID tag 104. In FIG. 2, power source 212 is illustrated as being connected to processor 206. It is understood that power source 212 may also be coupled to one or more of antenna 202, modulator/demodulator 204, memory 208 and clock 210. In some examples, power source 212 may include a battery. In some examples, power source 212 may include a battery charger, such as, without being limited to, a motion-powered charger, a solar charger, etc. In some examples, power source 212 may be activated and/or charged when RFID tag 104 is in a predetermined proximity of RFID reader 126.

In some examples, RFID tag 104 may be configured to detect a presence of vehicle 106 when it is within a first predetermined distance (or range) from vehicle 106. For example, processor 206 of RFID tag 104 may detect the presence of vehicle 106 by detecting a periodically transmitted signal (e.g., interrogation signal 408) from RFID reader(s) 126 of vehicle 106. In another example, RFID tag 104 may detect the presence of vehicle 106 based on detecting another suitable type of signal transmitted by one or more systems of vehicle 106. In some examples, the periodic signal transmitted by vehicle 106 may only be detected when a strength of the transmitted signal is greater than a predetermined threshold that corresponds to the first predetermined distance.

In some examples, when RFID tag 104 detects a presence of vehicle 106, RFID tag 104 may alert object 102 to the presence of vehicle 106. For example, RFID tag 104 may include one or more output devices (not shown), that may output an alert, such as a repetitive sound (e.g., beeping), output pre-recorded audio (e.g., speaking a warning such as "danger" or "caution"), output one or more vibrations (e.g., by using a vibration motor), output a visible alert (e.g., a flashing light), etc.

In some examples, RFID tag 104 may be configured to detect the presence of vehicle 106 when vehicle 106 is within the first predetermined distance (and in some examples, may indicate an alert to object 102), but RFID tag 104 may not be configured to interact with object detection system 108 until RFID tag 104 is within a second predetermined distance that may be different from the first predetermined distance. In some examples, the first predetermined distance may be greater than the second predetermined distance. In some examples, the first and second distances for respective detection and communication may be based on one or more signal characteristics (e.g., transmission frequency, signal strength, etc.) of the signal to be detected and/or transmitted. In one non-limiting example, the first predetermined distance may be about 70 feet (about 21.3 meters) and the second predetermined distance may be about 5 feet (about 1.5 meters). Thus, in this example, RFID tag 104 may detect the presence of vehicle 106 when vehicle 106 is up to about 70 feet away, but may not be configured to interact with (e.g., communicate with) object detection system 108 until RFID tag 104 reaches about 5 feet to vehicle 106.

In the examples described herein, a transmitting component on object 102 is described as RFID tag 104. In some examples, the transmitting component may include all or fewer than all of the components of RFID tag 104 shown in FIG. 2. In some examples, the transmitting component may be a more general transmitting component configured to include a transmitter and/or transceiver configured to at least transmit a signal indicating object 102 (such as tag signal 406) and, in some examples, receive a signal from object detection system 108. The transmitting component may also include a processor for generating the signal to be transmitted and/or to analyze a signal received from object detection system 108. In some examples, the transmitting component may further include storage for storing computer-readable instructions, rules, parameters, identification information, etc., associated with the transmitting component, analysis of signal(s) from object detection system 108 and/or object 102.

Referring next to FIG. 3, FIG. 3 is a functional block diagram illustrating example RFID reader 126 of object detection system 108, according to an aspect of the present disclosure. RFID reader 126 may include at least one antenna 302, modulator/demodulator 304, processor 306, memory 308, clock 310 and power source 312. Clock 310 is similar to clock 210 (FIG. 2).

In some examples, RFID reader 126 may be embodied as an integrated circuit including at least modulator/demodulator 304, processor 306 and memory 308. In some examples, the integrated circuit may include power source 312 (e.g., a battery). In some examples, power source 312 may be separate from the integrated circuit. In some examples, power source 312 may be a battery of vehicle 106. In some examples, RFID reader 126 may represent a passive reader (e.g., a reader which receives radio signals from one or more active RFID tags). In some examples, RFID reader 126 may represent an active reader (e.g., where RFID reader 126 transmits interrogation signal 408).

Antenna 302 is similar to antenna 202 (FIG. 2). Antenna 302 may be configured to receive a modulated RF signal transmitted from RFID tag 104 (e.g., tag signal 406 shown in FIG. 4) associated with object 102 (FIG. 1). In some examples, antenna 302 may be configured to transmit a modulated RF signal (e.g., interrogation signal 408 as shown in FIG. 4) received from modulator/demodulator 304. In some examples, antenna 302 may include at least one receiving antenna. In some examples, antenna 302 may include at least one transmitting antenna and at least one separate receiving antenna. In some examples, antenna 302 may include at least one integrated transmitting and receiving antenna.

In some examples, antenna 302 may be configured to scan at least one frequency band in order to detect the presence of tag signal 406. In some examples, detection of tag signal 406 may include determining that a signal strength of tag signal 406 is greater than a predetermined threshold. It is understood that RFID reader 126 may use any other suitable means for detecting the presence of tag signal 406. In some examples, processor 306 may determine whether the tag signal is detected.

Modulator/demodulator 304 is similar to modulator/demodulator 204. Modulator/demodulator 304 may include a circuit for at least demodulating a modulated RF signal received by antenna 302 (e.g., tag signal 406). In some examples, modulator/demodulator 304 may include a circuit for modulating an output signal generated by processor 306 (e.g., to form interrogation signal 408). Thus, in some examples, modulator/demodulator 304 may include a demodulator. In some examples, modulator/demodulator 304 may include both a modulator and a demodulator.

Processor 306 may be configured to receive a demodulated tag signal (from modulator/demodulator 304) transmitted by RFID tag 104 (e.g., tag signal 406) and to determine at least one characteristic about RFID tag 104 (also referred to herein as tag characteristic) based on the tag signal and or information in the tag signal. Processor 306 may store the determined tag characteristic(s), such as in memory 308 and/or in other storage (e.g., storage 314). Processor 306 may also provide the determined tag characteristic(s) to object detection module 128.

For example, information in tag signal 406 may include at least one characteristic of RFID tag 104 and/or at least one characteristic of object 102. In some examples, processor 306 may also obtain a signal strength or other suitable measure and/or characteristic of the tag signal itself (e.g., temporal characteristics, frequency characteristics, etc.). For example, a signal strength may be used by object detection module 128 to determine a range of vehicle 106 to object 102. As another example, the frequency band scanned by antenna 302 may indicate a proximity of vehicle 106 to object 102. This is because, as discussed above, different frequency bands are associated with different signal transmission ranges. Thus, a tag signal detected in the HF band, for example, may indicate a closer proximity to vehicle 106 than a tag signal detected in the UHF band. As yet another example, based on a transmission time interval of tag signal or a transmission time (which may be information included in tag signal 406) together with a time of receipt of periodic tag signals 406 by RFID reader 126, a movement, acceleration, etc. of object 102 may be determined. It is understood that the above examples are non-limiting examples, and that processor 306 may determine any suitable characteristic of tag signal 406, RFID tag 104 and/or object 102 which may be used to track object 102 and provide improved collision avoidance measures by CAS 100.

In some examples, processor 306 may repeatedly obtain a (demodulated) tag signal (via antenna 302) and determine at least one tag characteristic, for at least one predetermined condition. The predetermined condition may include any suitable condition, such as, without being limited to, a signal strength of tag signal 406 being greater than a predefined threshold, a transmission timing interval of RFID tag signal 406, a predefined tag signal collection period, an instruction received from object detection module 128, etc.

In some examples, processor 306 may generate, in response to the demodulated tag signal, an interrogation signal, to verify tag signal 406 (e.g., to confirm the presence of RFID tag 104). Modulator/demodulator 304 may modulate the interrogation signal output by processor 306, and antenna 302 may transmit the (modulated) interrogation signal 408. If processor 306 (by way of antenna 302 and modulator/demodulator 304) receives an ACK signal (or other suitable response) from RFID tag 104, processor 306 may proceed with determining at least one tag characteristic.

In some examples, RFID reader 126 may be activated and/or deactivated by object detection module 128. For example, an instruction from object detection module 128 may cause RFID reader 126 to begin scanning in at least one frequency band. In some examples, object detection module 128 may also select the frequency band, or change a selected frequency band during scanning for tag signal 406. As another example, an instruction from object detection module 128 may cause RFID reader 126 to terminate scanning.

Processor 306 may include, without being limited to, a microprocessor, an application specific integrated circuit (ASIC), a field programmable gate array (FPGA), and/or a digital signal processor (DSP) configured to execute processing logic for performing the functions described herein. Memory 308 may be configured to store information, such as one or more tag characteristics, predetermined scanning conditions, predetermined frequency bands for scanning, etc. In general, memory 308 may include any suitable non-transitory computer readable storage medium, including without being limited to, at least one of a read-only memory (ROM), a random access memory (RAM), a flash memory, a dynamic RAM (DRAM) and a static RAM (SRAM).

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Figure 5:
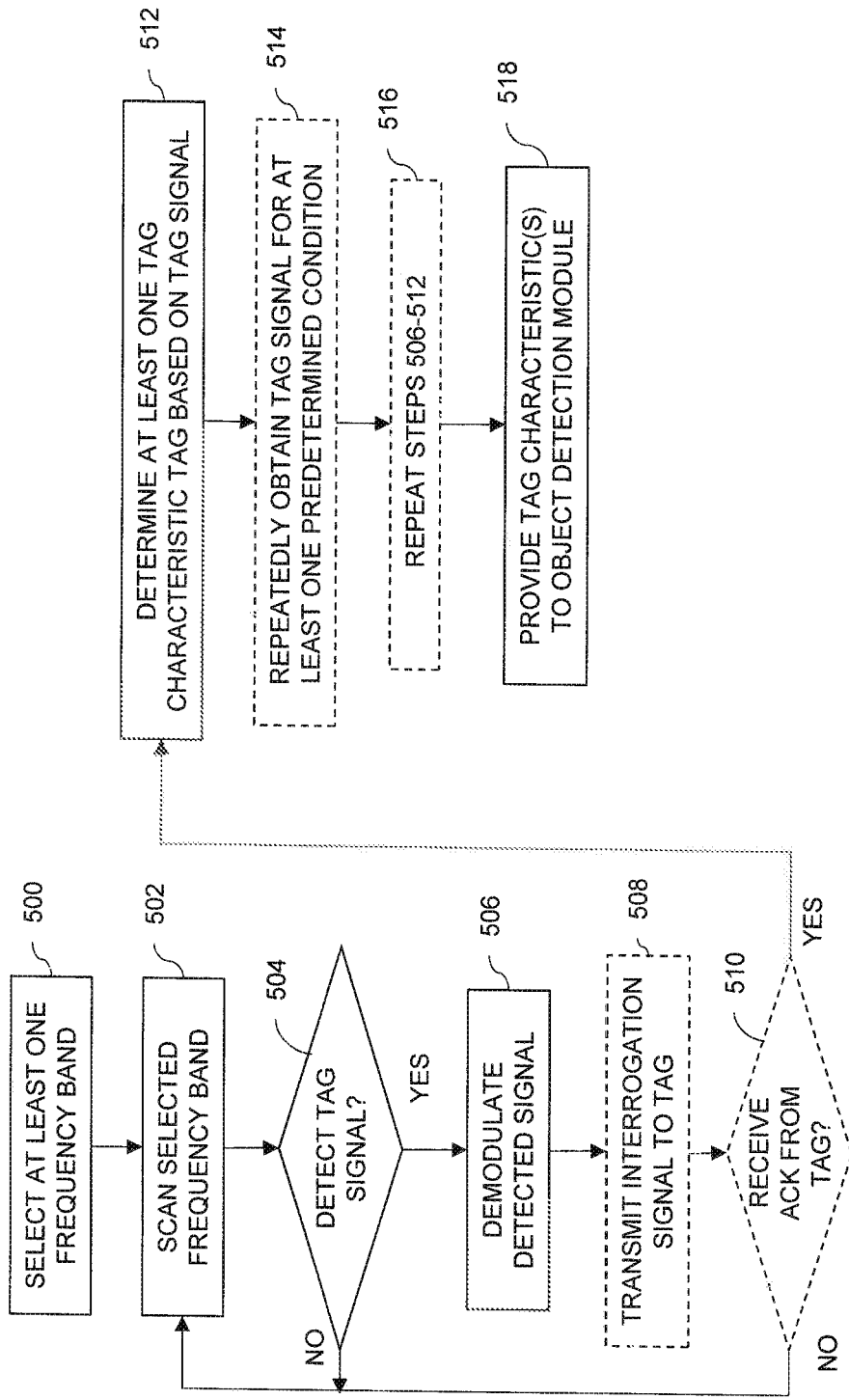
FIG. 5 is a flow chart diagram of an example method of detecting an RFID tag associated with an object, associated with the collision avoidance system shown in FIG. 1, according to an aspect of the present disclosure.
Figure 6:
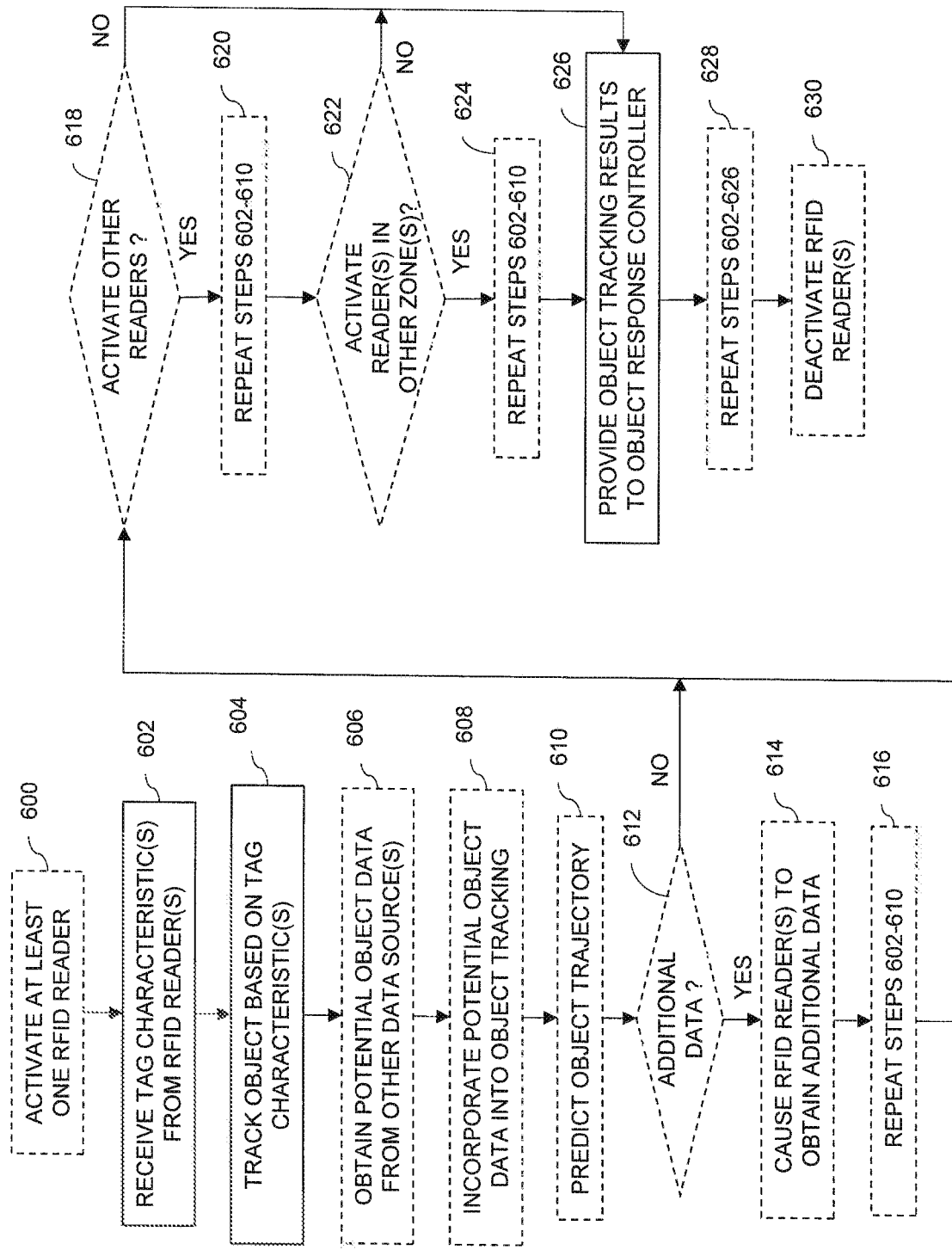
FIG. 6 is a flow chart diagram of an example method for tracking an object based on RFID tag detection, associated with the collision avoidance system shown in FIG. 1, according to an aspect of the present disclosure.
Figure 7:
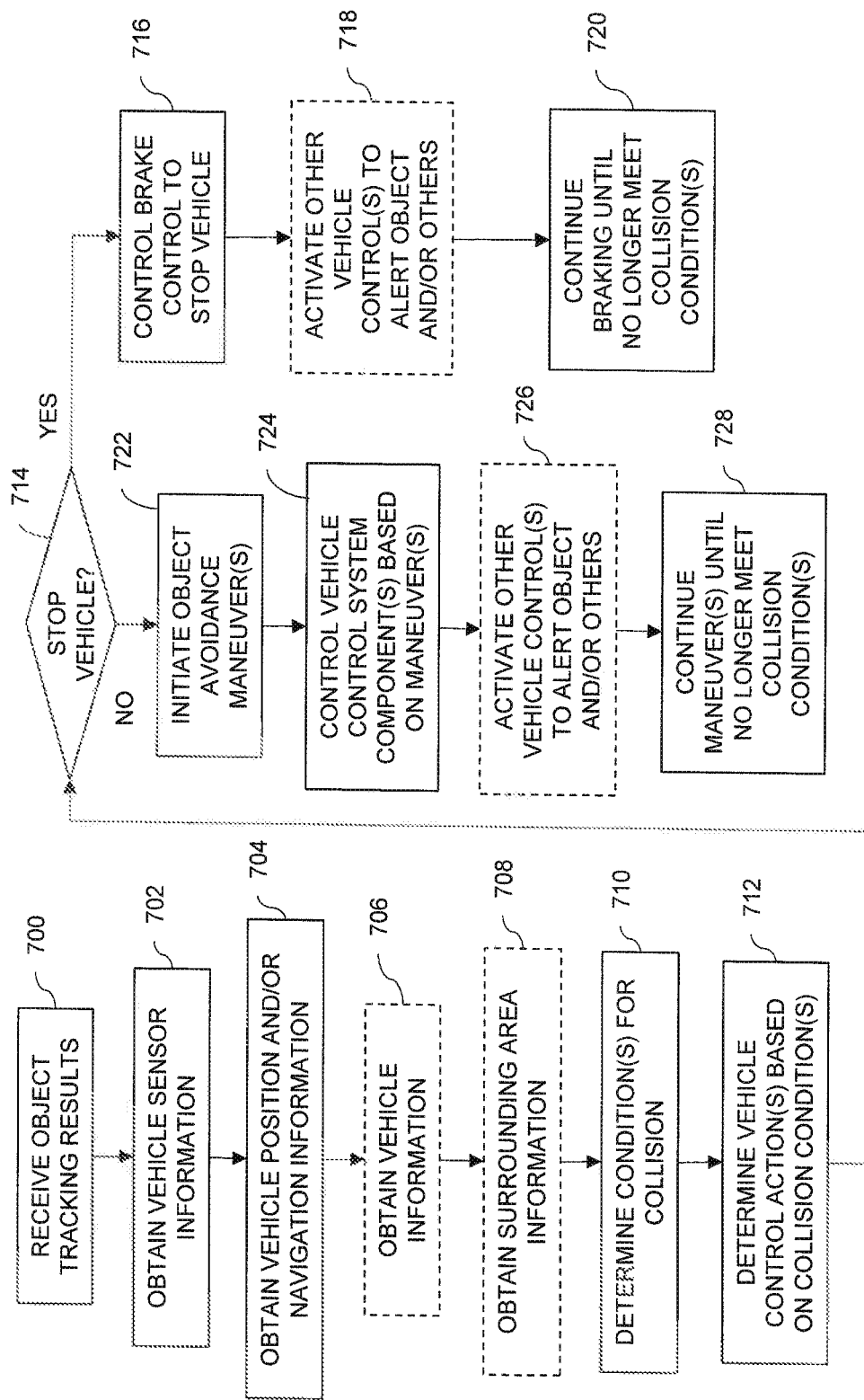
FIG. 7 is a flow chart diagram of an example method of controlling operation of a vehicle control system based on RFID tracking, associated with the collision avoidance system shown in FIG. 1, according to an aspect of the present disclosure.

Those skilled in the art will appreciate that vehicle 106 may be configured with more or less modules to conduct the methods described herein with reference to FIGS. 5-7. As illustrated in FIGS. 5-7, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 5-7 may be performed by one or more specialized processing components associated with components 104 and 108-122 of CAS 100 of FIG. 1. FIGS. 5-7 are described with respect to FIGS. 1-4.

Referring next to FIG. 5, FIG. 5 is a flow chart diagram of an example method of detecting RFID tag 104 attached to object 102, according to an aspect of the present disclosure. In FIG. 5, the illustrated steps may be performed by components of at least one RFID reader 126 (e.g., as illustrated in FIG. 3). FIG. 5 illustrates method steps that may be performed by one RFID reader 126. It is understood that object detection system 108 may include one or more RFID readers 126, and that similar steps may be performed by each of at least a portion of the one or more RFID readers 126.

At step 500, at least one frequency band may be selected for scanning of tag signal 406. For example, processor 306 may perform the selection (for example, based on one or more predetermined scanning rules). In some examples, object detection module 128 may provide processor 306 with the selected frequency band(s) for scanning.

At step 502, at least one antenna 302 may perform a scan over the selected frequency band(s) in order to detect the presence of tag signal 406. For example, tag signal 406 may be detected based on a signal strength threshold, a tag signal profile (e.g., in the time and/or frequency domain), etc. In some examples, antenna(s) 302 may scan two or more frequency bands simultaneously (or substantially simultaneously). In some examples, antenna(s) 302 may scan two or more frequency bands sequentially, or may scan two or more frequency bands at different predetermined times. In some examples, step 502 may be initiated by object detection module 128.

At step 504, it is determined whether tag signal 406 is detected in at least one of the selected frequency band(s), for example, by processor 306. When, at step 504, it is determined that tag signal 406 is not detected in any of the selected frequency band(s), step 504 proceeds to step 502, and scanning of the selected frequency band(s) may continue.

When it is determined that tag signal 406 is detected in at least one of the selected frequency band(s), step 504 proceeds to step 506. At step 506, modulator/demodulator 304 may demodulate the detected tag signal.

At optional step 508, processor 306 may analyze the content of the demodulated tag signal and generate an interrogation signal based on the content of the tag signal. Modulator/demodulator 304 may modulate the interrogation signal and antenna(s) 302 may transmit the (modulated) interrogation signal (e.g., interrogation signal 408). For example, the generated interrogation signal may include some identifier associated with RFID tag 104 (e.g., based on received tag signal 406) and an indication of a request for acknowledgement. In some examples, the generated interrogation signal may include a request for further information.

At optional step 510, it is determined (e.g., by processor 306) whether an ACK signal is received from RFID tag 104, responsive to interrogation signal 408. For example, a signal may be detected via antenna 302, modulator/demodulator 304 may demodulate the detected signal, and processor 306 may analyze the demodulated (detected) signal to confirm that the signal is an ACK signal associated with RFID tag 104. In this manner, processor 306 may verify RFID tag 104, and may reduce false detection of tag signals. When, at optional step 510, processor 306 confirms receipt of an ACK signal from RFID tag 104, optional step 510 may proceed to step 512.

At step 512, processor 306 may determine at least one tag characteristic based on the received tag signal 406. As discussed above, the tag characteristic(s) may include information about the tag signal itself, information about RFID tag 104 included in tag signal 406, information associated with object 102 included in tag signal 406 and/or any other information included in tag signal 406. In some examples, processor 306 may generate and include a timestamp with the tag characteristic(s). The timestamp may correspond to an arrival time at RFID reader 126 of tag signal 406. In some examples, the tag characteristic(s) may be stored, for example, in memory 308 and/or storage 314.

At optional step 514, RFID reader 126 may repeatedly obtain tag signal 406 (e.g., where tag signal 406 is periodically transmitted by RFID tag 104) via antenna(s) 302 for at least one predetermined condition. At optional step 516, steps 506-512 may be repeated, to create a set of tag characteristics for the predefined condition(s). In some examples, the set of tag characteristic(s) may be stored, for example, in memory 308 and/or storage 314. In some examples, RFID reader 126 may generate a include a timestamp associated with each obtained tag signal 406.

At step 518, processor 306 may provide the tag characteristic(s) (or set of tag characteristic(s)) to object detection module 128. In some examples, object detection module 128 may cause RFID reader 128 to cease scanning for tag signal 406.

Referring next to FIG. 6, FIG. 6 is a flow chart diagram of an example method for tracking object 102 based on detection of RFID tag signal 406, according to an aspect of the present disclosure. In FIG. 6, the illustrated steps may be performed by components of object detection module 128 in communication with RFID reader(s) 126 and object response controller 116 (e.g., as illustrated in FIG. 1). At optional step 600, object detection module 128 may activate at least one RFID reader 126. In some examples, RFID reader(s) 126 may be activated internally (e.g., based on a predefined time, date, period of time) and/or may be activated periodically.

At step 602, object detection module 128 may receive at least one tag characteristic from RFID reader(s) 126. The tag characteristic(s) may include at least one tag characteristic for at least one obtained tag signal 406. In some examples, the tag characteristic(s) may include a set of tag characteristic(s) obtained from a number of tag signals. In some examples, the tag characteristic(s) may include corresponding timestamp(s).

At step 604, object detection module 128 may track object 102 based on the tag characteristic(s). For example, object detection module 128 may determine whether object 102 is stationary or moving, accelerating or deaccelerating, a range of vehicle 106 to object 102, a region containing object 102 with respect to vehicle 106, a current trajectory of object 102, and any other suitable variables for tracking object 102.

At optional step 606, object detection module 128 may obtain information and/or data from one or more other data sources, such as camera(s) 118, collision sensor(s) 120, vehicle computing system 110, etc., which may include potential information regarding object 102. At optional step 608, object detection module 128 may incorporate the potential object information from other data source(s) into the object tracking analysis. For example, data and/or information from other data source(s) may be used to verify the existence of object 102, verify and/or adjust the location of object 102, verify and/or adjust a current trajectory of object 102, etc.

At optional step 610, object detection module 128 may predict a future trajectory of object 102. For example, based on past tag characteristic(s) data collected over one or more timestamps, a future trajectory of object 102 may be predicted. Object detection module 128 may also consider object characteristics that may be included in the tag characteristic(s) to predict the future trajectory. For example, object detection module 128 may modify the predicted trajectory if the object characteristics indicate a human with a physical impairment, such as a wheelchair user.

At optional step 612, object detection module 128 may determine whether to obtain additional data from the activated RFID reader(s) 126. For example, the determination may be based on a confidence measure or any other suitable measure associated with the tracking results of object 102 (e.g., step 604), data and/or information in the received tag characteristic(s) and/or a future object trajectory (e.g., optional step 610).

When, at optional step 612, it is determined to obtain additional data, optional step 612 proceeds to optional step 614. At optional step 614, object detection module 128 may cause one or more (already activated) RFID readers 126 to obtain additional data, such as additional tag characteristic(s) and/or any other suitable information. For example, object detection module 128 may transmit an instruction to processor 306 of a particular RFID reader 126 to obtain the additional data. In some examples, the additional data to be obtained may be based on any deficiencies and/or low confidence measures associated with one or more characteristics of the object tracking results (e.g., a low confidence in a trajectory of object 102, etc.). At step optional 616, steps 602-610 may be repeated. Optional step 616 may proceed to optional step 618.

When, at optional step 612, it is determined not to obtain additional data, optional step 612 may proceed to optional step 618.

At optional step 618, object detection module 128 may determine whether to activate one or more other RFID readers 126. For example, other RFID readers 126 in a same tracking zone (e.g., tracking zone 402-1 shown in FIG. 4) may be activated. For example, the determination may be based on a confidence measure (or any other suitable measure) associated with the object tracking results (e.g., step 604), data and/or information in the received tag characteristic(s) and/or a future object trajectory (e.g., optional step 610).

When, at optional step 618, it is determined to activate at least one other RFID reader 126, optional step 618 may proceed to optional step 620. At optional step 620, steps 602-610 may be repeated, for the newly activated other RFID reader(s) 126. Optional step 620 may proceed to optional step 622.

When, at optional step 618, it is determined not to activate other RFID reader(s) 126, optional step 618 may proceed to step 626.

At optional step 622, object detection module 128 may determine whether to activate one or more RFID readers 126 in one or more other tracking zones (e.g., tracking zone 404-1 shown in FIG. 4). For example, the determination may be based on a confidence measure (or any other suitable measure) associated with the object tracking results (e.g., step 604), data and/or information in the received tag characteristic(s) and/or a future object trajectory (e.g., optional step 610).

When, at optional step 622, it is determined to activate a RFID reader(s) 126 in other tracking zone(s), optional step 622 may proceed to optional step 624. At optional step 620, steps 602-610 may be repeated, for the newly activated RFID reader(s) 126 in the new tracking zone(s). Optional step 624 may proceed to step 626.

When, at optional step 622, it is determined not to activate RFID reader(s) 126 in other tracking zone(s), optional step 622 may proceed to step 626.

At step 626, object detection module 128 may provide the object tracking results (e.g., determined from one or more RFID reader(s) 126 and/or captured over one or more timestamps) to object response controller 116. In some examples, the object tracking results may also include one or more object characteristics from among the received tag characteristic(s). In some examples, object detection module 128 may provide additional object information to object response controller 116, based on potential object data received from other data source(s) (e.g., optional step 606).

At optional step 628, steps 602-626 may be repeated one or more times. For example, steps 602-626 may be repeated until object 102 is no longer detected by RFID reader(s) 126, until object detection module 128 receives an instruction from object response controller 116 (e.g., terminating object detection), and/or for any other suitable condition.

At optional step 630, object detection module 128 may deactivate one or more RFID reader(s) 126.

It is understood that, in some examples, RFID reader(s) 126, object detection module 128 and object response controller 116 may operate in combination to continually detect, track and avoid object 102.

Although FIG. 6 describes the example of tracking one object 102, object detection system 108 is not limited to tracking a single object. In some examples, object detection module 128 may track one or more objects 102. For example, object detection module 126 may distinguish between two or more objects 102 based on tag identification information associated with each respective tag. In this manner, object detection system 108 may receive two or more tag signals 406, associate each tag signal 406 with a respective RFID tag 104 (e.g., based on a unique RFID tag identifier), obtain tag characteristic(s) for each tag, and obtain tracking results for each respective tag. In some examples, CAS 100 (e.g., object response controller 116) may distinguish a stationary first object (e.g., which may be avoidable by vehicle 106 without any further avoidance measures by CAS 100) and a different moving second object (e.g., which may be on a collision trajectory with vehicle 102). CAS 100 may then focus its collision avoidance determination on the second moving object, rather than the first objection. CAS 100 may use any suitable techniques to distinguish between different objects 102.

Referring next to FIG. 7, FIG. 7 is a flow chart diagram of an example method of controlling operation of vehicle 106 for avoiding a collision with object 102 (detected by object detection system 108), according to an aspect of the present disclosure. In FIG. 7, the illustrated steps may be performed by components of object response controller 116 in communication with objection detection system 108, vehicle computing sensor 110, vehicle sensor system 112 and vehicle control system 114 (e.g., as illustrated in FIG. 1).

At step 700, object response controller 116 may receive object tracking results from object detection module 128. In some examples, object tracking results may include, without being limited to, tag and/or object information (e.g., obtained from tag signal 406), trajectory, projected future trajectory, any acceleration or deceleration, a range to object 102, a region containing object 102, etc.

At step 702, object response controller 116 may obtain vehicle sensor information from among one or more sensors of vehicle sensor system 112. At step 704, object response controller 116 may obtain vehicle position information and/or navigation information, for example, from GPS receiver 130 and/or navigation system 132 of vehicle computing system 110.

At optional step 706, object response controller 116 may obtain other vehicle information, for example, from one or more components of vehicle computing system 110, vehicle sensor system 112, vehicle control system 114 and/or operator interface 122. For example, object response controller 116 may determine a state of attentiveness of the vehicle operator, which may be useful for determining vehicle control action(s) for avoiding collision with object 102. As another example, object response controller 116 may obtain information regarding weather conditions and/or road conditions, which may affect visibility, braking conditions, etc. of vehicle 106. It is understood that object response controller 116 may obtain any suitable information for determining any conditions for potential collision and/or any vehicle control actions. At optional step 708, object response controller 116 may obtain information associated with an area surrounding vehicle 106, for example, from camera(s) 118 and/or collision sensor(s) 120.

At step 710, object response controller 116 may determine one or more conditions indicating a possibility of collision between vehicle 106 and object 102. The condition(s) for collision may include, without being limited to, one or more estimated location(s) of impact with respect to vehicle 106, at least one estimated time of impact, a probability of collision (or any other suitable prediction measure), a probability of maneuvering around object 102 (e.g., without colliding with object 102 and/or other surrounding objects), one or more possible vehicle maneuvering trajectories, etc. In some examples, the collision condition(s) may take into account any object information (e.g., included in tag signal 406), such as any impairments of a pedestrian (e.g., where object 102 is a pedestrian). Object response controller 116 may determine collision condition(s) based on information obtained from among steps 700-708. In some examples, object response controller 116 may determine the collision condition(s) using any suitable algorithm, such as without being limited to AI algorithm(s).

At step 712, object response controller 116 may determine one or more vehicle control actions based on the collision condition(s) (step 710) as well as the other obtained information (e.g., steps 700-708). In general, the vehicle control action(s) may include one or more actions for controlling one or more components of vehicle control system 114 to avoid collision with object 102. In some examples, the vehicle control action(s) may include one or more highest probable vehicle control action(s) having a minimal probability of collision in combination with one or more other factors (such as avoiding surrounding objects, a braking ability, weather and/or road conditions, object information, vehicle operator ability (e.g., whether the vehicle operator is distracted), etc.). In some examples, object response controller 116 may determine the vehicle control action(s) using any suitable algorithm, such as, without being limited to AI algorithm(s).

In some examples, object response controller 116 may determine that no vehicle action(s) may be necessary for avoiding object 102 (e.g., object 102 may no longer be within a trajectory that may lead to a collision with vehicle 106). In some examples, when object response controller 116 determines that no vehicle action(s) are needed, the collision avoidance procedure may be terminated.

It may be understood that, in some examples, object response controller 116 may repeatedly obtain information (in steps 700-708) and update the collision condition(s) (step 710) and vehicle control action(s) (step 712) with the most up-to-date information.

At step 714, object response controller 116 may determine whether to stop vehicle 106 or to initiate object avoidance maneuvers, based on the vehicle control action(s) (step 712). If, at step 714, it is determined to stop vehicle 106, step 714 may proceed to step 716. At step 716, object response controller 116 may control operation of brake control 156 to brake vehicle 106, based on the vehicle control action(s).

At optional step 718, object response controller 116 may activate one or more other vehicle controls, for example, to alert object 102, alert a vehicle operator, alert other vehicles and/or alert any other objects near vehicle 106. For examples, lighting control 158 may be modified to flash headlights, indicate hazard lights, etc. Audio control 160 may reduce an audio level within vehicle 106 and/or output an audible warning to the vehicle operator. In general, the present disclosure contemplates any suitable activation and/or modification of other vehicle controls, user interface 140, operator interface 122 before, during and/or after any collision avoidance maneuvers, including braking.

At step 720, object response controller 116 may continue to control braking control 156 until the collision condition(s) are no longer met. In other words, braking may be applied until object 102 is no longer in a trajectory of vehicle 106. In some examples, vehicle operator input 124 may override the continued braking (in step 720).

When it is determined, at step 714, to initiate object avoidance maneuver(s), step 714 may proceed to step 722. At step 722, object response controller 116 may initiate one or more object avoidance maneuver(s), based on the determined vehicle control action(s) (step 712). In some examples, the object avoidance maneuver(s) may include at least one vehicle maneuvering trajectory (e.g., determined in step 710). At step 724, object response controller 116 may control one or more components of vehicle control system 114 (e.g., steering control 154, brake control 156, etc.) based on the object avoidance maneuver(s) (step 722). For example, vehicle 106 may (via object response controller 116) steer away from object 102 while triggering brake control 156.

At optional step 726, object response controller 116 may activate one or more other vehicle controls, for example, to alert object 102, alert a vehicle operator, alert other vehicles and/or alert any other objects near vehicle 106.

At step 728, object response controller 116 may continue to perform the object avoidance maneuver(s) (step 724) until the collision condition(s) are no longer met. In other words, object avoidance maneuver(s) may be applied until object 102 is no longer in a trajectory of vehicle 106. In some examples, vehicle operator input 124 may override the continued maneuver(s) (in step 728).

Although not shown, in some examples, one or more of object detection system 108 and object response controller 116 may communicate with an external system (e.g., embodied on one or more computer servers). The external system may perform some of the operations of object detection module 128 and/or objection response controller 116 for tracking object 102, determining collision condition(s) and/or vehicle control action(s) for vehicle 106.

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer specifically configured to perform the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with one or more components of vehicle 106 (including components 108-122 or an external system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a cellular telephone, a personal digital assistant, a smartphone, or any other computing and/or communication device.

The term "network" shall refer to any type of network or networks, including those capable of being utilized in connection with CAS 100 described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 8:
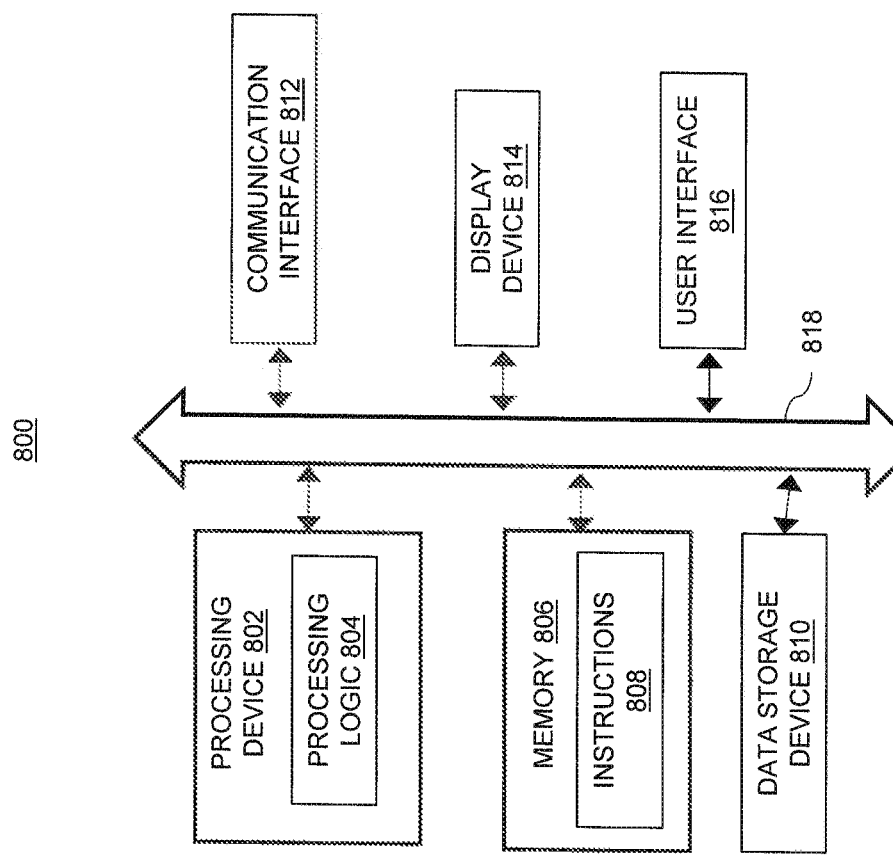
FIG. 8 is a functional block diagram of an example computer system, according to an aspect of the present disclosure.

FIG. 8 illustrates a functional block diagram of a machine in the example form of computer system 800 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set for multiple sets) of instructions to perform any one or more of the methodologies discussed herein. In some examples, one or more components of vehicle 106 (object detection system 108, vehicle computing system 110, vehicle sensor system 112, vehicle control system 114, object response controller 116, camera(s) 118, collision sensor(s) 120 and/or operator interface 122) may be implemented by the example machine shown in FIG. 8 (or a combination of two or more of such machines).

Example computer system 800 may include processing device 802, memory 806, data storage device 810 and communication interface 812, which may communicate with each other via data and control bus 818. In some examples, computer system 800 may also include display device 814 and/or user interface 816.

Processing device 802 may include, without being limited to, a microprocessor, a central processing unit, an application specific integrated circuit (ASIC), a field programmable gate array (FPGA), a digital signal processor (DSP) and/or a network processor. Processing device 802 may be configured to execute processing logic 804 for performing the operations described herein. In general, processing device 802 may include any suitable special-purpose processing device specially programmed with processing logic 804 to perform the operations described herein.

Memory 806 may include, for example, without being limited to, at least one of a read-only memory (ROM), a random access memory (RAM), a flash memory, a dynamic RAM (DRAM) and a static RAM (SRAM), storing computer-readable instructions 808 executable by processing device 802. In general, memory 806 may include any suitable non-transitory computer readable storage medium storing computer-readable instructions 808 executable by processing device 802 for performing the operations described herein. For example, computer-readable instructions 808 may include operations performed by components 108-122 of vehicle 106), including operations shown in FIGS. 5-7). Although one memory device 806 is illustrated in FIG. 8, in some examples, computer system 800 may include two or more memory devices (e.g., dynamic memory and static memory).

Computer system 800 may include communication interface device 812, for direct communication with other computers (including wired and/or wireless communication) and/or for communication with a network. In some examples, computer system 800 may include display device 814 (e.g., a liquid crystal display (LCD), a touch sensitive display, etc.). In some examples, computer system 800 may include user interface 816 (e.g., an alphanumeric input device, a cursor control device, etc.).

In some examples, computer system 800 may include data storage device 810 storing instructions (e.g., software) for performing any one or more of the functions described herein. Data storage device 810 may include any suitable non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for avoiding at least one object, the system comprising:
   a vehicle; and
   a radio frequency identification (RFID) tag disposed on the at least one object, the RFID tag configured to detect a presence of the vehicle when the RFID tag is within a first predetermined distance from the vehicle and configured to communicate with the vehicle when the RFID tag is within a second predetermined distance from the vehicle, the RFID tag configured to communicate by transmitting a tag signal associated with the RFID tag the first predetermined distance being greater than the second predetermined distance, the first predetermined distance being less than a communication range of the RFID tag,
   the vehicle comprising:
      an object detection system configured to detect the transmitted tag signal associated with the RFID tag, determine at least one tag characteristic from the detected tag signal and track the at least one object based on the at least one tag characteristic to generate object tracking data, and
      an object response controller configured to receive the object tracking data from the object detection system, determine at least one collision condition between the vehicle and the at least one object based on the object tracking data, and initiate at least one vehicle control action responsive to the at least one collision condition, the at least one vehicle control action including automatically controlling operation of the vehicle by the object response controller to avoid a collision between the vehicle and the at least one object.

2. The system of claim 1, wherein the at least one vehicle control action includes at least one of brake control and one or more object avoidance maneuvers, the one or more object avoidance maneuvers including steering control of the vehicle.

3. The system of claim 1, wherein the RFID tag is configured to be wearable.

4. The system of claim 1, wherein the RFID tag is configured to periodically transmit the tag signal.

5. The system of claim 1, wherein the at least one tag signal characteristic includes at least one of information associated with the RFID tag and information associated with the at least one object.

6. The system of claim 1, wherein the object tracking data includes at least one of a range of the at least one object relative to the vehicle, whether the at least one object is stationary, a current trajectory, a predicted future trajectory, a region containing the at least one object, a speed and one or more characteristics of the at least one object.

7. The system of claim 1, wherein the object detection system is configured to incorporate potential object data from at least one other data source to generate the object tracking data.

8. The system of claim 1, wherein the at least one collision condition includes at least one of an estimated location of impact on the vehicle, an estimated time of impact, a probability of collision, a probability of maneuvering around the at least one object and one or more possible vehicle maneuvering trajectories.

9. The system of claim 1, wherein one or more of the at least one collision condition and the at least one vehicle control action are based on at least one of information from at least one vehicle sensor, a vehicle position, navigation information, surrounding area information of the vehicle, the at least one tag characteristic, traffic information, weather conditions, road conditions and additional information associated with one or more of a vehicle operation and a vehicle operator.

10. The system of claim 1, wherein the object detection system includes:
    at least one RFID reader configured to detect the transmitted tag signal and determine the at least one tag characteristic; and
    an object detection module configured to generate the object tracking data based on the at least one tag characteristic obtained from the at least one RFID reader.

11. The system of claim 10, wherein the at least one RFID reader is configured to scan at least one frequency band to detect the transmitted tag signal.

12. The system of claim 10, wherein the at least one RFID reader is configured to verify the at least one RFID tag responsive to detecting the tag signal.

13. The system of claim 10, wherein the at least one RFID reader is configured to repeatedly detect the transmitted tag signal and determine the at least one tag characteristic in accordance with at least one predetermined condition.

14. The system of claim 10, wherein the at least one RFID reader is positioned on the vehicle and configured to detect any tag signals within at least one tracking zone proximate the vehicle.

15. The system of claim 10, wherein the at least one RFID reader includes a plurality of RFID readers, the object detection module is configured to create a plurality of tracking zones through at least one of selective activation and monitoring of particular ones among the plurality of RFID readers, and the object detection module is configured to activate one or more of the plurality of RFID readers among the plurality of tracking zones, based on the at least one tag characteristic received from among one or more of the plurality of RFID readers, to track the at least one object among the plurality of tracking zones.

16. A method for avoiding at least one object by a vehicle, the method comprising:
  detecting, by a radio frequency identification (RFID) tag, a presence of the vehicle when the RFID tag is within a first predetermined distance from the vehicle, the RFID tag disposed on the at least one object, the first predetermined distance being less than a communication range of the RFID tag;
  communicating, by the RFID tag, with the vehicle, when the RFID tag is within a second predetermined distance from the vehicle, the first predetermined distance being greater than the second predetermined distance, the communicating including transmitting, by the RFID tag, a tag signal associated with the RFID tag;
  detecting, by an object detection system of the vehicle, the transmitted tag signal associated with the RFID tag;
  determining, by the object detection system, at least one tag characteristic from the detected tag signal;
  tracking, by the object detection system, the at least one object based on the at least one tag characteristic to generate object tracking data;
  receiving, by an object response controller of the vehicle, the object tracking data from the object detection system;
  determining, by the object response controller, at least one collision condition between the vehicle and the at least one object based on the object tracking data; and
  initiating, by the object response controller, at least one vehicle control action responsive to the at least one collision condition, the at least one vehicle control action including automatically controlling operation of the vehicle by the object response controller to avoid a collision between the vehicle and the at least one object.

17. The method of claim 16, wherein the at least one vehicle control action includes at least one of brake control and one or more object avoidance maneuvers.

18. The method of claim 16, wherein the at least one tag signal characteristic includes at least one of information associated with the RFID tag and information associated with the at least one object.

19. The method of claim 16, wherein:
  the detecting of the transmitted tag signal includes detecting the transmitted tag signal by at least one RFID reader, and
  the determining of the at least one tag characteristic includes determining the at least one tag characteristic by the at least one RFID reader.

20. The method of claim 19, the method further comprising scanning, by the at least one RFID reader, at least one frequency band to detect the transmitted tag signal.

21. The method of claim 19, the method further comprising verifying, by the at least one RFID reader, the at least one RFID tag responsive to detecting the tag signal.

22. The method of claim 19, wherein the RFID tag is configured to periodically transmit the tag signal, the method further comprising:
  repeatedly detecting, by the at least one RFID reader, the periodically transmitted tag signal and determining the at least one tag characteristic in accordance with at least one predetermined condition.

23. The method of claim 19, wherein the at least one RFID reader is positioned on the vehicle, the method further comprising:
  detecting, by the at least one RFID reader, any tag signals within at least one tracking zone proximate the vehicle.

24. The method of claim 19, wherein the at least one RFID reader includes a plurality of RFID readers and a plurality of tracking zones are created, by an object detection module of the object detection system, through at least one of selective activation and monitoring of particular ones among the plurality of RFID readers, the method further comprising:
  activating, by the object detection module of the object detection system, one or more of the plurality of RFID readers among the plurality of tracking zones, based on the at least one tag characteristic received from among one or more of the plurality of RFID readers, to track the at least one object among the plurality of tracking zones.

25. The method of claim 16, the method further comprising:
  triggering at least one other data source to capture information associated with the at least one object;
  determining one or more object characteristics of the at least one object based on the captured information from the at least one other data source, the one or more object characteristics including at least one of a dimension, a shape, an identity type and a behavior pattern; and
  determining the at least one vehicle control action at least in part based on the determined one or more object characteristics.

26. The method of claim 16, the method further comprising:
  predicting by at least one artificial intelligence (AI) algorithm included in at least one of the object detection system and the object response controller, one or more object actions; and
  determining the at least one vehicle control action responsive to the predicted one or more object actions.

27. The method of claim 16, the method further comprising:
  communicating, via at least one electronic network, with at least one external data source to obtain additional data associated with the at least one object when at least the object tracking data meets at least one predetermined condition, the at least one vehicle control action being determined based at least in part on the obtained additional data.

28. The method of claim 16, the method further comprising:
  outputting, by the RFID tag, an alert indication when the RFID tag detects the presence of the vehicle within the first predetermined distance.

29. A non-transitory computer readable medium storing computer readable instructions that, when executed by one or more processing devices, cause the one or more processing devices to perform the functions comprising:
  detecting, by a transmitting component, a presence of a vehicle when the transmitting component is within a first predetermined distance from the vehicle, the transmitting component disposed on at least one object, the first predetermined distance being less than a communication range of the transmitting component;
  communicating, by the transmitting component, when the transmitting component is within a second predetermined distance from the vehicle, the first predetermined distance being greater than the second predetermined distance, the communicating including transmitting a tag signal associated with the transmitting component;

detecting the tag signal transmitted by the transmitting component;
determining at least one tag characteristic from the detected tag signal;
tracking the at least one object based on the at least one tag characteristic to generate object tracking data;
determining at least one collision condition between the vehicle and the at least one object based on the object tracking data; and
initiating at least one vehicle control action responsive to the at least one collision condition, the at least one vehicle control action including automatically controlling operation of the vehicle to avoid a collision between the vehicle and the at least one object.

30. The non-transitory computer readable medium of claim 29, wherein the transmitting component comprises a radio frequency identification (RFID) tag.

\* \* \* \* \*